(12) United States Patent
Lester

(10) Patent No.: US 10,859,137 B2
(45) Date of Patent: Dec. 8, 2020

(54) PUMPJACK INERTIA CAPACITOR

(71) Applicant: William Terry Lester, Fort Worth, TX (US)

(72) Inventor: William Terry Lester, Fort Worth, TX (US)

( * ) Notice: Subject to any disclaimer, the term of this patent is extended or adjusted under 35 U.S.C. 154(b) by 154 days.

(21) Appl. No.: 16/217,783

(22) Filed: Dec. 12, 2018

(65) Prior Publication Data

US 2019/0186597 A1 Jun. 20, 2019

Related U.S. Application Data

(60) Provisional application No. 62/599,093, filed on Dec. 15, 2017.

(51) Int. Cl.
| | |
|---|---|
| *F16H 1/22* | (2006.01) |
| *F16F 15/30* | (2006.01) |
| *F16H 37/02* | (2006.01) |
| *F04B 47/02* | (2006.01) |
| *F03G 3/08* | (2006.01) |
| *F16H 7/02* | (2006.01) |
| *F16H 57/021* | (2012.01) |
| *F16H 33/08* | (2006.01) |

(52) U.S. Cl.
CPC .................. *F16H 1/22* (2013.01); *F03G 3/08* (2013.01); *F04B 47/022* (2013.01); *F16F 15/30* (2013.01); *F16H 7/02* (2013.01); *F16H 33/08* (2013.01); *F16H 37/02* (2013.01); *F16H 57/021* (2013.01)

(58) Field of Classification Search
None
See application file for complete search history.

(56) References Cited

U.S. PATENT DOCUMENTS

| | | | | | |
|---|---|---|---|---|---|
| 1,335,249 | A | * | 3/1920 | Leymarie ............... | F16H 33/02 74/342 |
| 2,803,151 | A | * | 8/1957 | Clerk ..................... | B60K 6/105 475/267 |
| 3,091,132 | A | * | 5/1963 | Mayfield ............. | F16H 37/0846 475/211 |
| 3,641,843 | A | * | 2/1972 | Lemmens ........... | F16H 37/0846 475/212 |
| 3,861,485 | A | * | 1/1975 | Busch ..................... | B60K 1/00 180/65.7 |
| 3,870,116 | A | * | 3/1975 | Seliber ................... | B60K 6/105 180/165 |
| 4,586,879 | A | * | 5/1986 | Slater ..................... | F04B 47/02 417/411 |
| 4,588,040 | A | * | 5/1986 | Albright, Jr. ........... | B60L 50/16 180/165 |
| 4,651,582 | A | * | 3/1987 | Bender ................... | F04B 47/02 254/326 |

(Continued)

*Primary Examiner* — Dirk Wright

(57) ABSTRACT

A kinetic energy storage device, a pumpjack inertia capacitor (PIC), for use with an oil well pumpjack, the PIC includes a primary shaft assembly to transfer power and torque between a prime mover of the oil well pumpjack, a flywheel assembly having one or more flywheels, and an output assembly, the one or more flywheels absorb and then transfer torque to an oil well pumping unit to enable the oil well pumping unit to operate at a near constant speed; and the one or more flywheels enable the prime mover to operate at a near constant speed and a near constant power.

14 Claims, 27 Drawing Sheets

(56) References Cited

U.S. PATENT DOCUMENTS

| | | | | |
|---|---|---|---|---|
| 4,723,452 A * | 2/1988 | Watson | F04B 47/022 | 74/41 |
| 4,743,172 A * | 5/1988 | Watson | F04B 47/022 | 417/362 |
| 4,997,346 A * | 3/1991 | Bohon | F04B 9/02 | 417/319 |
| 5,336,061 A * | 8/1994 | Armstrong | F04B 9/06 | 417/411 |
| 5,809,985 A * | 9/1998 | Kingsley | B23D 47/12 | 125/13.01 |
| 6,325,142 B1 * | 12/2001 | Bosley | E21B 47/009 | 166/53 |
| 6,361,457 B1 * | 3/2002 | May | F16H 55/56 | 474/32 |
| 6,433,450 B1 * | 8/2002 | Chao | H02K 47/14 | 290/4 C |
| 6,488,605 B2 * | 12/2002 | van Druten | B60K 6/105 | 475/207 |
| 6,962,223 B2 * | 11/2005 | Berbari | B60K 6/105 | 180/165 |
| 8,104,560 B1 * | 1/2012 | Huang | B60K 6/30 | 180/165 |
| 9,028,362 B2 * | 5/2015 | He | B60K 6/365 | 477/3 |
| 9,284,940 B2 * | 3/2016 | Lee | F03B 13/186 | |
| 10,119,370 B2 * | 11/2018 | Ocalan | E21B 34/066 | |
| 10,340,755 B1 * | 7/2019 | Dreher | F01B 9/02 | |
| 2005/0248321 A1 * | 11/2005 | Liu | B62M 1/10 | 322/4 |
| 2009/0179431 A1 * | 7/2009 | Wilson, Sr. | H02K 53/00 | 290/1 R |
| 2011/0105269 A1 * | 5/2011 | Sato | F03G 7/10 | 475/331 |

* cited by examiner

PUMPJACK INERTIA CAPACITOR

BACKGROUND

1. Field of the Invention

The present invention relates generally to the field of the oil well pumpjack, which is a crude oil extraction mechanism that lifts oil-rich liquid from below the ground, and more specifically to a kinetic energy storage device for oil well pumpjacks.

2. Description of Related Art

Crude oil has been commonly extracted from the ground by means of an oil well pumpjack (also known as donkey pumper, nodding donkey, pumping unit, horsehead pump, rocking horse, beam pump, dinosaur, sucker rod pump, grasshopper pump, Big Texas, thirsty bird, or jackpump) for more than a century. The oil well pumpjack is comprised of five major components: the prime mover, the gear reducer, the pumping unit, the sucker rod string, and the subsurface pump. The prime mover provides power to the system through either an electrical rotating motor, an electric motor-generator, or an internal combustion engine. The gear reducer reduces the output speed of the prime mover to a suitable pumping speed. The pumping unit translates the rotating motion of the gear reducer and prime mover into a reciprocating motion. The sucker rod string is located inside production tubing and transmits the reciprocating motion of the pumping unit to the subsurface pump. The subsurface pump lifts oily liquid out of the ground through the production tubing.

Prime movers are most efficient when operating at a constant rotational speed with constant torque, which results in constant power. All prime movers currently in use operate inefficiently due to forces and actions that affect their operation.

The electric motor-generator type of prime mover continuously switches between transferring the required energy to drive the pumpjack in the electric motor mode and then recovering and transferring the feedback energy (negative torque) to the electric power grid in the electric generator mode of operation, all in the effort to match the dynamic torque of the pump unit and to minimize the negative effects of the dynamic torque to the sucker rod string. Other types of prime movers lose efficiency due to their inability to absorb dynamic feedback torque.

The sucker rod string is subjected to continual cyclic stress as a result of dynamic loads. It eventually fails from repeated load reversals, also known as fatigue failures.

The inefficiency of the prime mover and the short life span of the sucker rod string increase the expense of operating an oil well pumpjack. This invention, the Pumpjack Inertia Capacitor (PIC) addresses both problems by improving the efficiency and service life of the pumpjack through smoothing the transfer of power and torque between the prime mover and gearbox using a system of one or more high kinetic energy flywheels.

Flywheels have been used in oil well pumpjacks. Prior art flywheels have not been effective in producing near constant speed or minimizing the negative effects of dynamic torque, which includes feedback torque to the prime mover, due to the insufficient amount of kinetic energy that can be stored. Prior art flywheels are not configured for substantial kinetic energy storage, and the rotational speeds of prior art flywheels are significantly lower than the rotational speeds of the flywheels of the proposed invention.

The invention herein consists of a unique configuration of flywheels, shafts, bearings, and gears that maximize the kinetic energy storage attainable in the flywheels while minimizing size and weight. The quantity of kinetic energy that can possibly be stored in the high energy flywheels of the PIC is substantiality greater than the amount that can be stored in prior art flywheels, thus enabling the oil well pumpjack to operate at near constant speed while minimizing the negative effects of dynamic torque.

A flywheel, also known as an inertia capacitor, is a rotating mechanical device used to store rotational energy or kinetic energy. Flywheels have a significant rotational mass moment of inertia and thus resist changes in rotational speed. The amount of energy stored in a flywheel is proportional to the square of its rotational speed. Energy is transferred to a flywheel by applying torque to it, thereby increasing its rotational speed and hence its stored energy. Conversely, a flywheel releases stored energy by applying torque to a mechanical load, thereby decreasing the flywheel's rotational speed.

The kinetic energy (KE) of a flywheel is equal to the product of one-half the flywheel's rotational mass moment of inertia (I) and the flywheel's rotational speed squared ($\frac{1}{2} I \omega^2$). The rotational mass moment of inertia is the mass property of a rigid body that determines the torque needed for a desired angular acceleration about an axis of rotation. The flywheel rotational speed ($\omega$) is the angular speed of the flywheel rotating about its axis.

Flywheels are typically made of steel and rotate on conventional bearings and are generally limited to a revolution rate of several thousand RPM. Some modern flywheels are made of carbon fiber materials and employ magnetic bearings, enabling them to revolve at speeds up to 60,000 RPM. The maximum flywheel rotational speed is dependent on the material and the radius of the flywheel.

BRIEF SUMMARY OF THE INVENTION

The present invention is called the Pumpjack Inertia Capacitor (PIC) and is a kinetic energy storage device for oil well pumpjacks that improves mechanical efficiency and extends the service life of oil well pumpjacks. The PIC is installed in a series between the prime mover and the gearbox of the oil well pumpjack and smooths out power and torque between the prime mover and the gearbox.

The PIC has the kinetic energy capacity to facilitate the optimal transfer of power throughout the oil well pumpjack for each pumping cycle. The flywheel enables the prime mover to operate at a near constant speed and near constant power for utmost efficiency. Feedback torque to the prime mover is eliminated. The PIC reduces the severity of the shock loads produced from each pumping cycle, which increases the service life of the pumpjack.

The present invention consists of one or more flywheels, where the flywheels and gears are fixed to shafts that are mounted on bearings to the frame. An input shaft that is connected to the prime mover is mounted on bearings to the frame. The input shaft has a gear that interacts with the gears on the flywheel shafts. An output shaft that is connected to the gearbox is mounted on bearings to the frame. The input and output shafts are coupled together with gears.

Utilizing V-belts and pulleys is one method to connect the input shaft to the prime mover and the output shaft to the gearbox. A pulley would be affixed on both the input and output shafts. Most likely several v-belts and multi-groove pulleys would be used to handle the power and torque loads of the pumpjack. The present invention is not limited to v-belts and multi-groove pulleys to handle power and torque loads.

The baseline parts for the PIC are one frame, one primary shaft assembly, one or more flywheel assemblies, and one output assembly. The primary shaft assembly has one shaft, two gears, one multi-groove pulley, and two bearings. Each flywheel assembly has one shaft, one gear, one flywheel, and two bearings. The output assembly has one shaft, one gear, one multi-groove pulley, and two bearings.

In an alternative version of the PIC the output assembly is eliminated. The shaft of the primary shaft assembly transfers the input torque and output torque.

In an alternative version of the PIC the v-belts and multi-groove pulleys that couple together the prime mover and the PIC are eliminated. The shafts of the prime mover and the primary shaft assembly coincide on the same axis of rotation and are joined together.

In an alternative version of the PIC a clutch and/or torque converter that facilitates the transfer of power and torque between the prime mover and the PIC is included. The clutch and/or torque converter enable the prime mover to operate at its rotational operating speed while the flywheels accelerate to their rotational speed. Once the input and output rotational speeds of the clutch and/or torque converter are the same, then the clutch and/or torque converter are locked.

In an alternative version of the PIC clutches and/or torque converters that facilitate the transfer of power and torque between the PIC and the gearbox are included. The clutch and/or torque converter are disengaged while the flywheels accelerate to their rotational operating speed. After the flywheels are rotating at their rotational operating speed, the clutches and/or torque converters enable the oil well pumpjack to accelerate smoothly to its operating speed. Once the input and output rotational speeds of the clutches and/or torque converters are equal, then the clutches and/or torque converters are locked.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
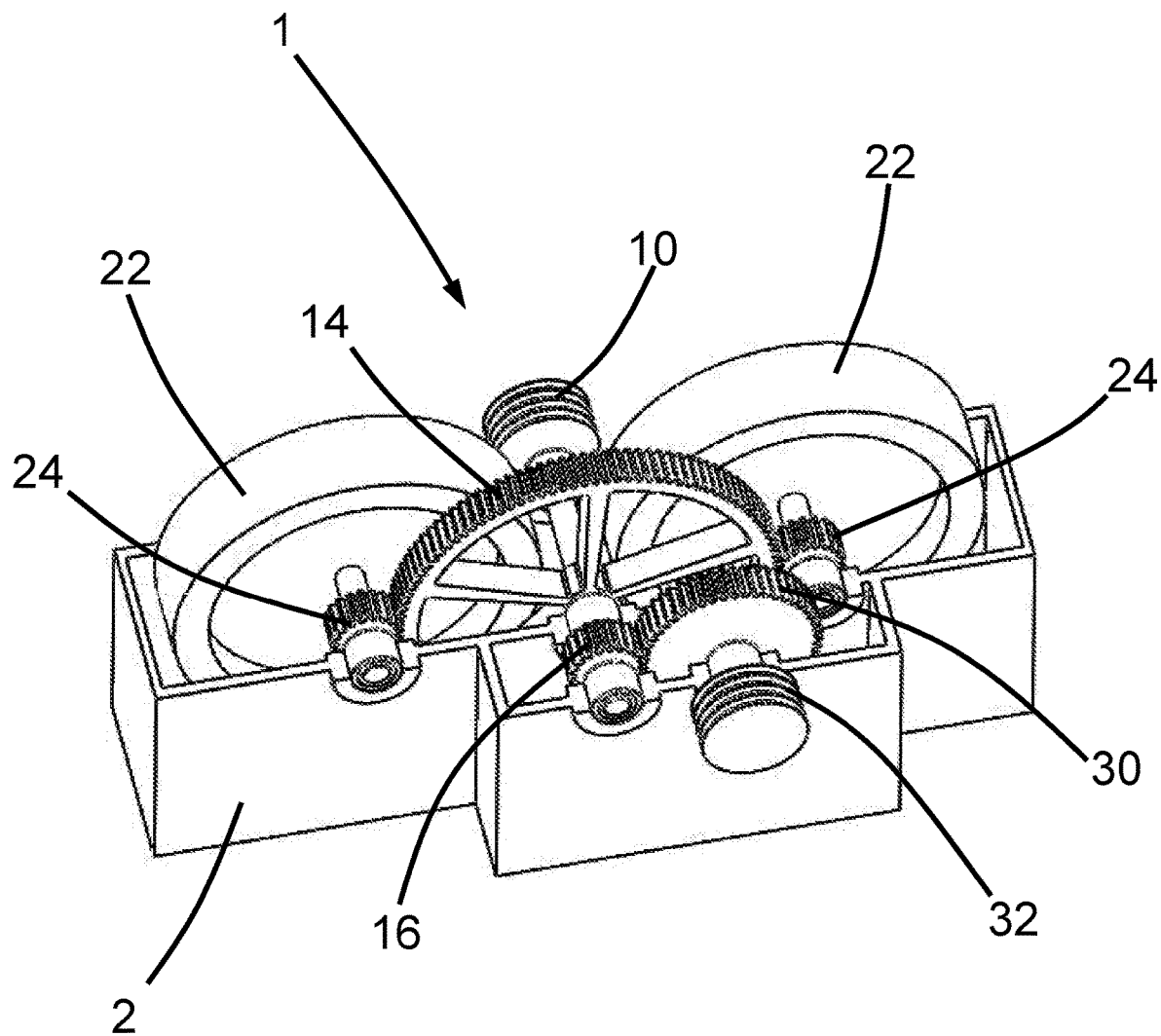
FIG. 1 is an isometric view of a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional oil well pumpjacks. Specifically, the present invention provides a unique configuration of flywheels, shafts, bearings, and gears that maximize kinetic energy that can be stored in a high energy flywheel, while minimizing size and weight. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts an isometric view of a pumpjack inertia capacitor 1, having a flywheel assembly 8 that smooths the transition of power and torque between the prime mover 66 and the gearbox 70 for an oil well pumpjack 64. The present invention 1 components are shown individually and also assembled into the present invention in FIGS. 2, 3, 4, 5, 6, and 7.

The present invention PIC 1 consists of a lower frame 2, a primary shaft assembly 8, a flywheel assembly 18, and an output assembly 26. The lower frame 2 is a support structure with bearing mounts 4 incorporated therein. The primary shaft assembly 8 includes a group of components that transfers power and torque between the prime mover 66, the flywheel assembly 18, and the output assembly 26. The primary shaft assembly 8 comprises a multi-groove pulley 10, an input shaft 12, a primary gear 14, and a primary output gear 16. The flywheel assembly 18 is the group of components that acts as the inertia capacitor of the present invention PIC 1 and consists of the flywheel shaft 20, the flywheel 22, and the flywheel gear 24. The output assembly 26 is the group of components that transfers power and torque between the gearbox 70 and the primary shaft assembly 8. The output assembly 26 consists of an output shaft 28, an output gear 30, and a multi-groove pulley 10. The upper frame 34 serves as the support structure and cover for the PIC.

Figure 2:
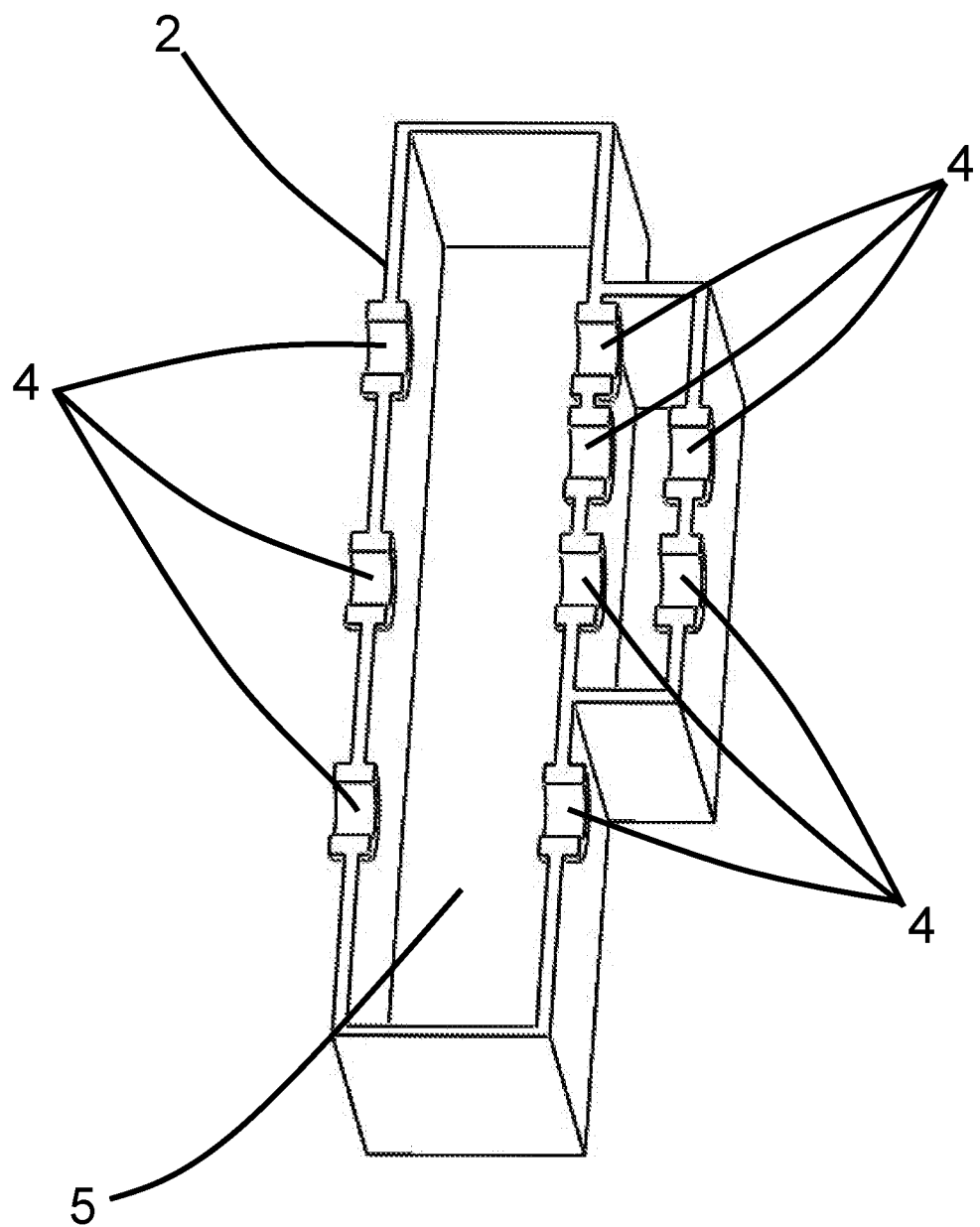
FIG. 2 is an isometric view of a lower frame of the present invention.
Figure 3:
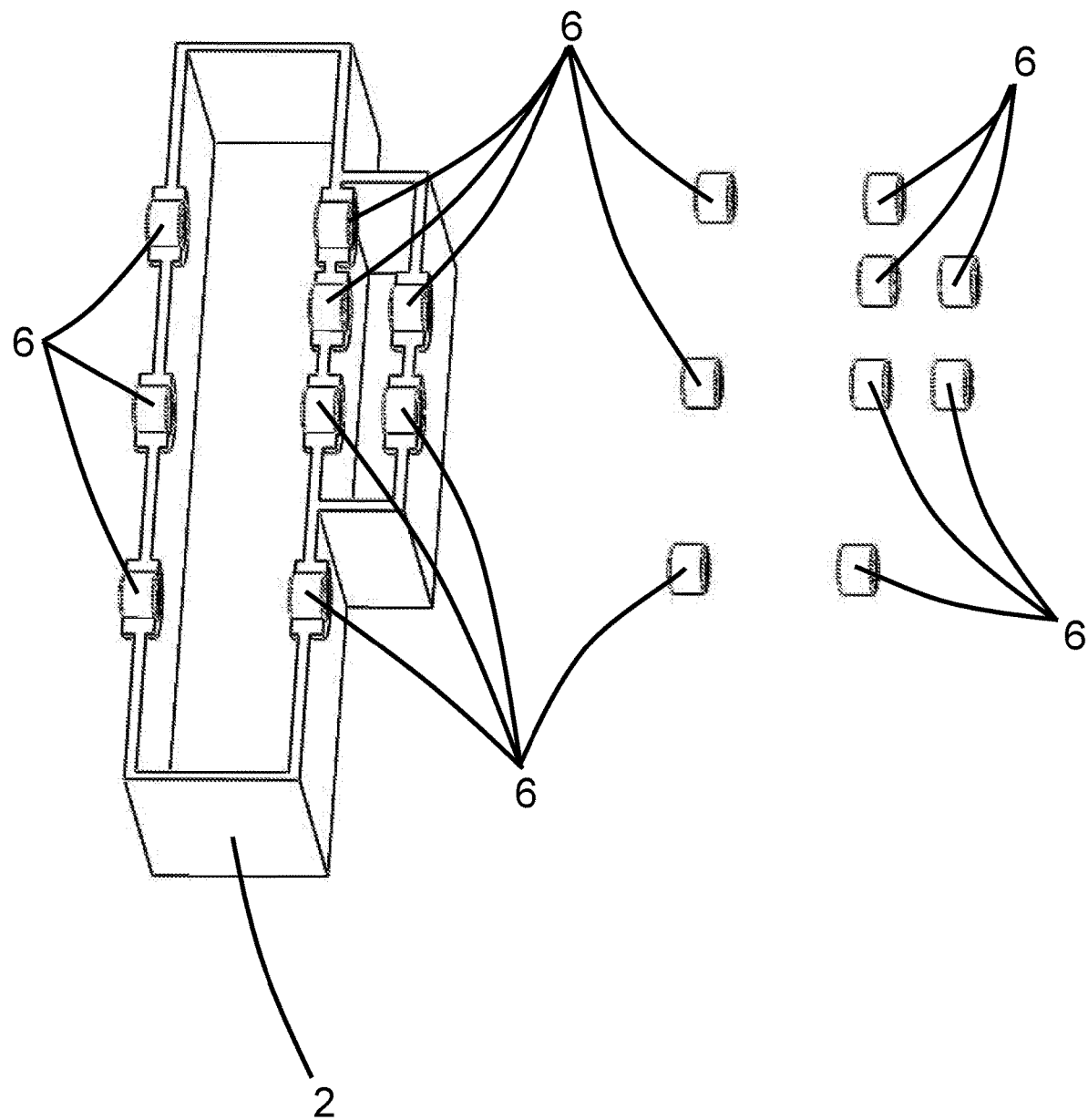
FIG. 3 is an isometric view of bearings and bearings as assembled into the present invention.

In the preferred embodiment, the lower frame 2, as shown in FIG. 2, is the support structure and casing of the present invention. A base 5 of the lower frame 2 is secured to a base 65 of the oil well pumpjack 98. The lower frame 2 has a plurality for bearing mounts 4 for bearings 6 for the primary shaft assembly 8, the flywheel assemblies 18, and the output assembly 26. A plurality of bearings 6, as shown in FIG. 3, enable the primary shaft assembly 8, flywheel assemblies 18, and output assembly 26 to freely rotate about their respective axes with small energy losses.

Figure 4:
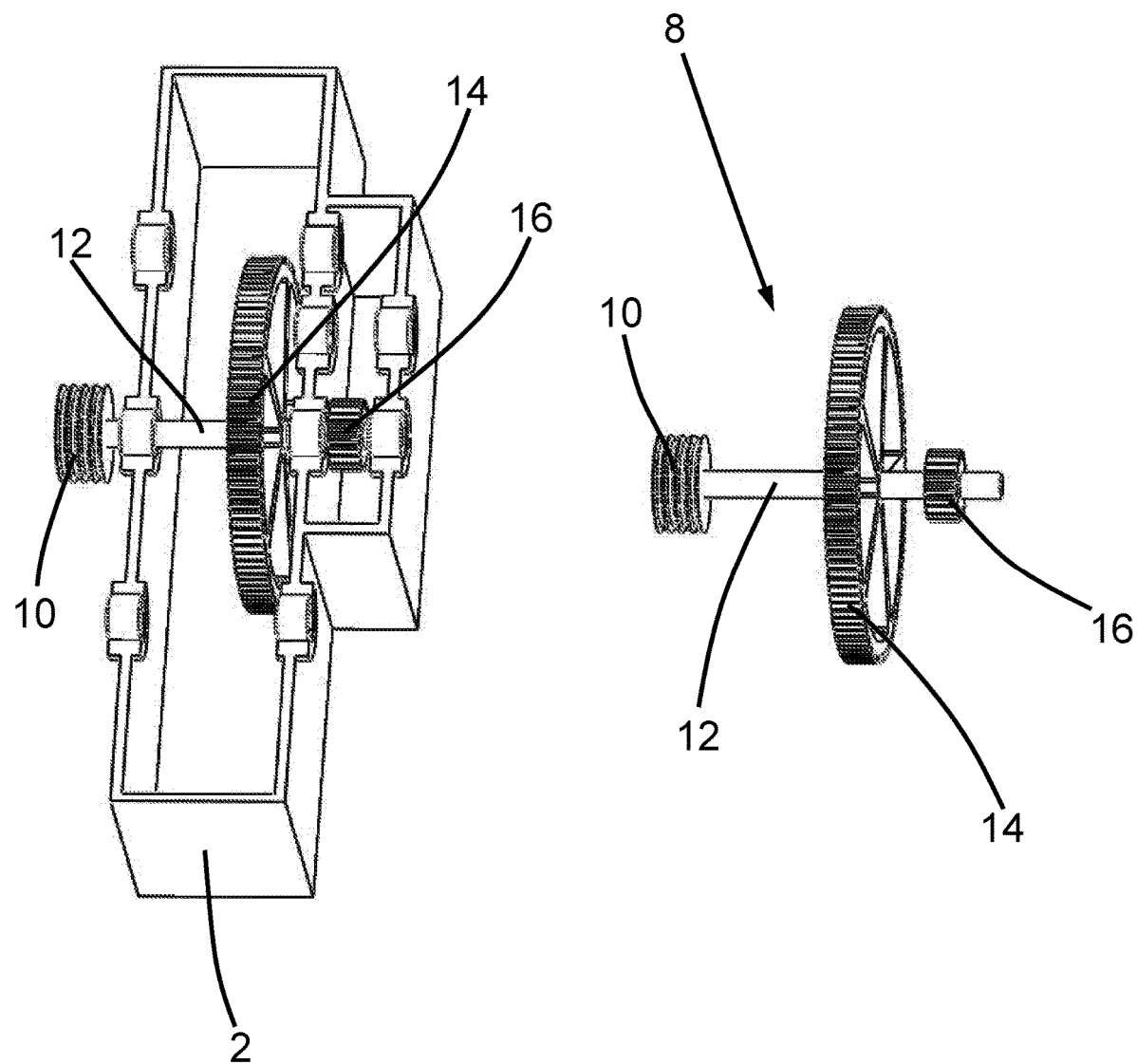
FIG. 4 is an isometric view of a primary shaft assembly and the primary shaft assembly as assembled into the present invention.

The primary shaft assembly 8, as shown in FIG. 4, transfers power and torque between the prime mover 66, the flywheel assembly 18, and the output assembly 26. The primary shaft assembly 8 comprises the multi-groove pulley 10, the input shaft 12, the primary gear 14, and the primary output gear 16. The multi-groove pulley 10 with the V-belt 69 and multi-groove pulley 67 transfers power and torque between the present invention PIC 1 and the prime mover 66. The multi-groove pulley 10 can be attached to either end of the input shaft 12 so that the multi-groove pulley 10 and a second groove pulley 32 (shown in FIG. 6) can be on the same side or opposite sides of the present invention PIC 1. The input shaft 12 is the rotating straight bar for transmitting motion, torque, and power between the multi-groove pulley 10, the primary gear 14, and the primary output gear 16. The input shaft 12 is connected to the frame 2 by bearings 6. The primary gear 14 is fixed to the input shaft 12 and is coupled with the flywheel gears 24. The primary output gear 16 is fixed to the input shaft 12 and is coupled with the output gear 30.

Figure 5:
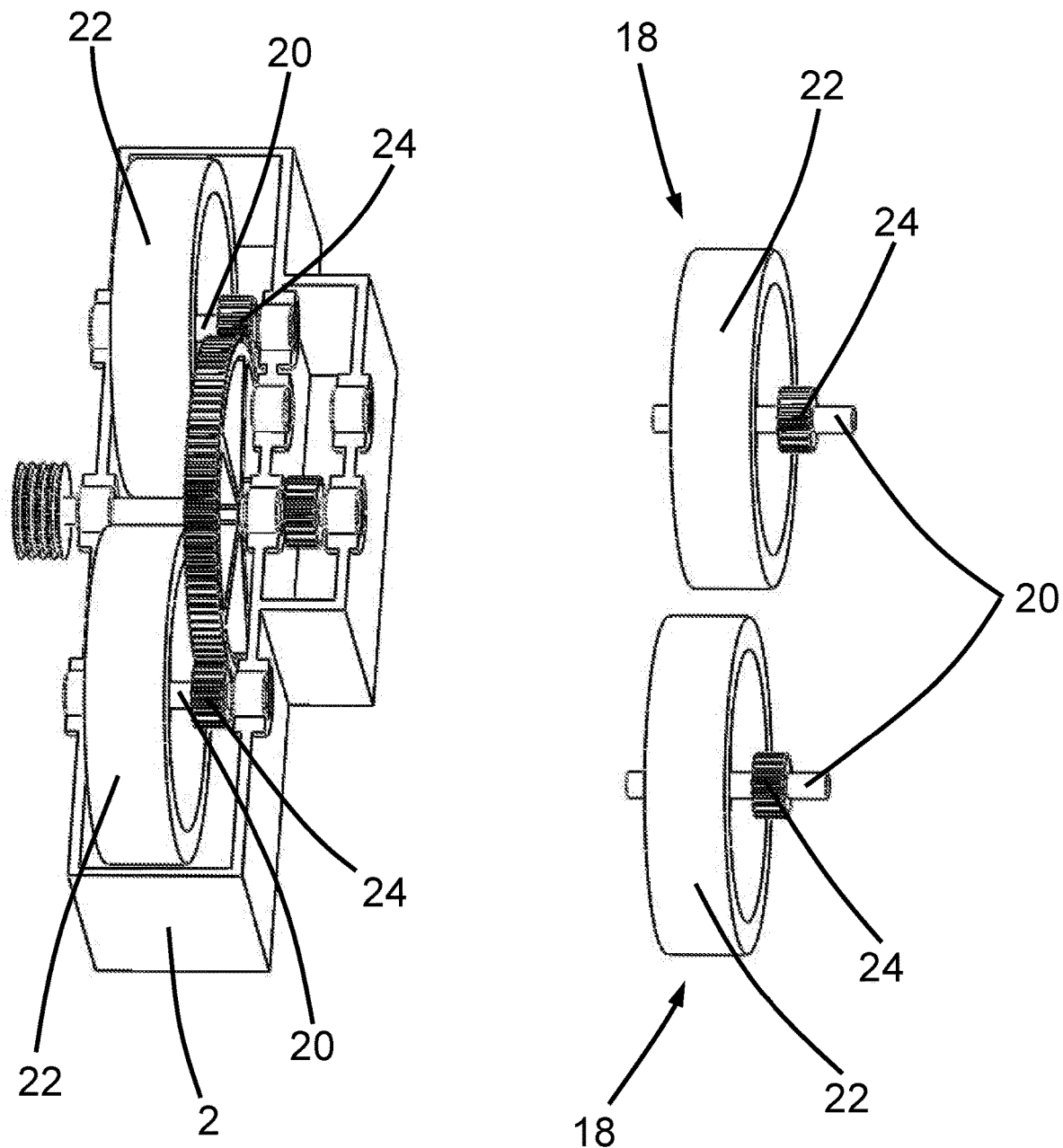
FIG. 5 is an isometric view of a flywheel assembly and the flywheel assembly as assembled into the present invention.

The present invention PIC 1 has one or more flywheel assemblies 18, as shown in FIG. 5. Each of the flywheel assemblies 18 is the inertia capacitor, which has ample kinetic energy to smooth the transition of power and torque between the prime mover 66 and the gearbox 70. Each flywheel assembly 18 comprises the flywheel shaft 20, the flywheel 22, and the flywheel gear 24. The flywheel shaft 20 is a rotating straight bar for transmitting motion, torque, and power between the flywheel 22, and the flywheel gear 24. The flywheel shaft 20 is connected to the frame 2 by one or more bearings 6. The speed ratio of the primary gear 14 and the flywheel gear 24 increases the rotational velocity of the flywheel assemblies 18 with respect to the rotational velocity of the primary shaft assembly 8.

Figure 6:
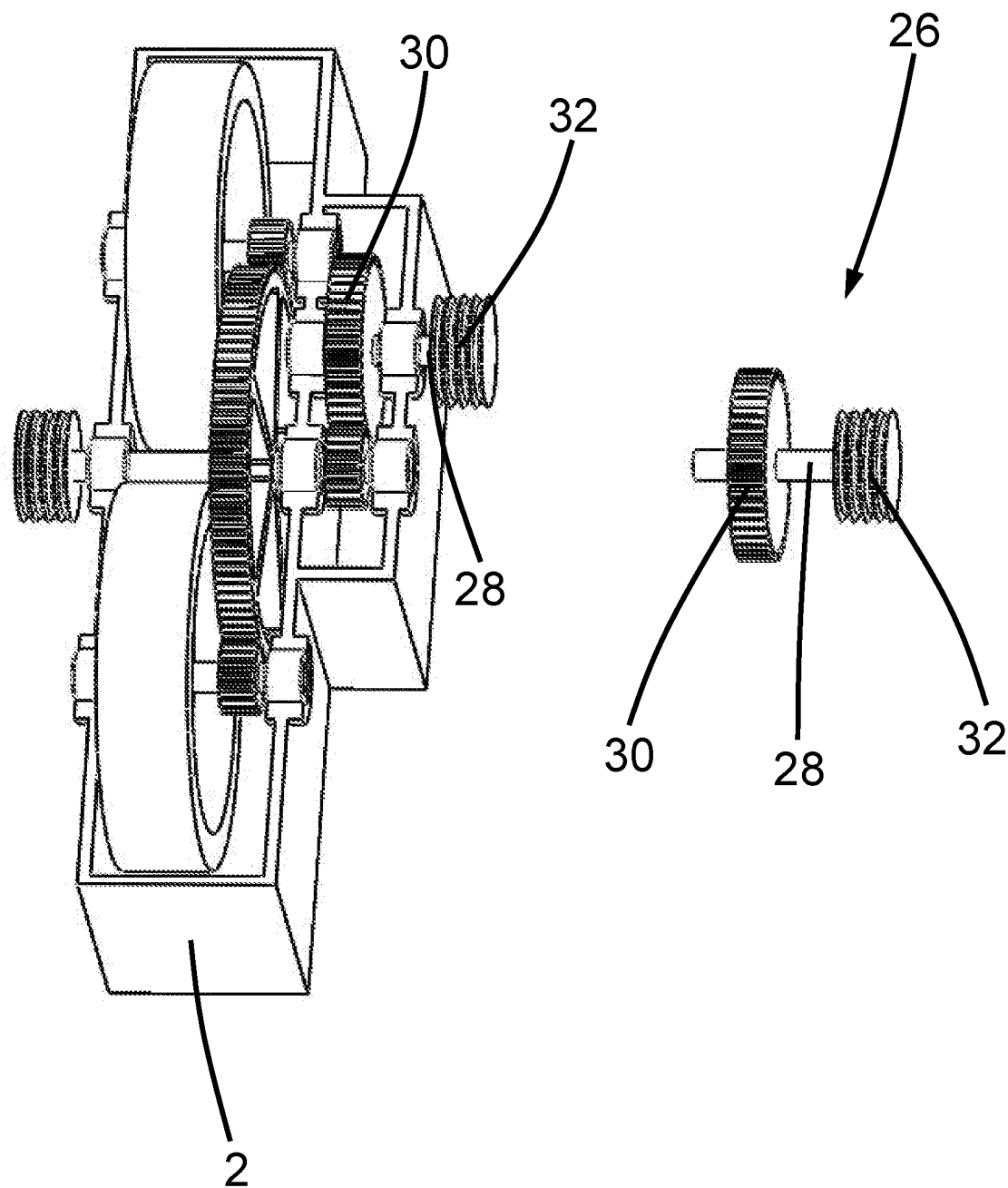
FIG. 6 is an isometric view of an output assembly and the output assembly as assembled into the present invention.

The output assembly 26, as shown in FIG. 6, is a group of components that transfers power and torque between the gearbox 70 and the primary shaft assembly 8 at the desired output speed. The output assembly 26 consists of output shaft 28, output gear 30, and a multi-groove pulley 32. The output shaft 28 is a rotating straight bar for transmitting motion, torque, and power between the output gear 30 and a multi-groove pulley 10. The output shaft 28 is connected to the frame 2 by bearings 6. The output gear 30 is fixed to the output shaft 28 and is coupled with the primary output gear 16. The multi-groove pulley 32 with the V-belt 73 and another multi-groove pulley 71 transfers power and torque between the present invention (PIC) 1 and the gearbox 70.

The output assembly 26 is used to adjust the output rotational speed relative to the input rotational speed of the present invention PIC 1. The difference between the input and the output rotational speed of the present invention PIC 1 is the speed ratio from the primary output gear 16 and the output gear 30. The oil well pumpjack 98 can operate at any rotational speed by changing the speed ratio from the primary output gear 16 and the output gear 30.

Figure 7:
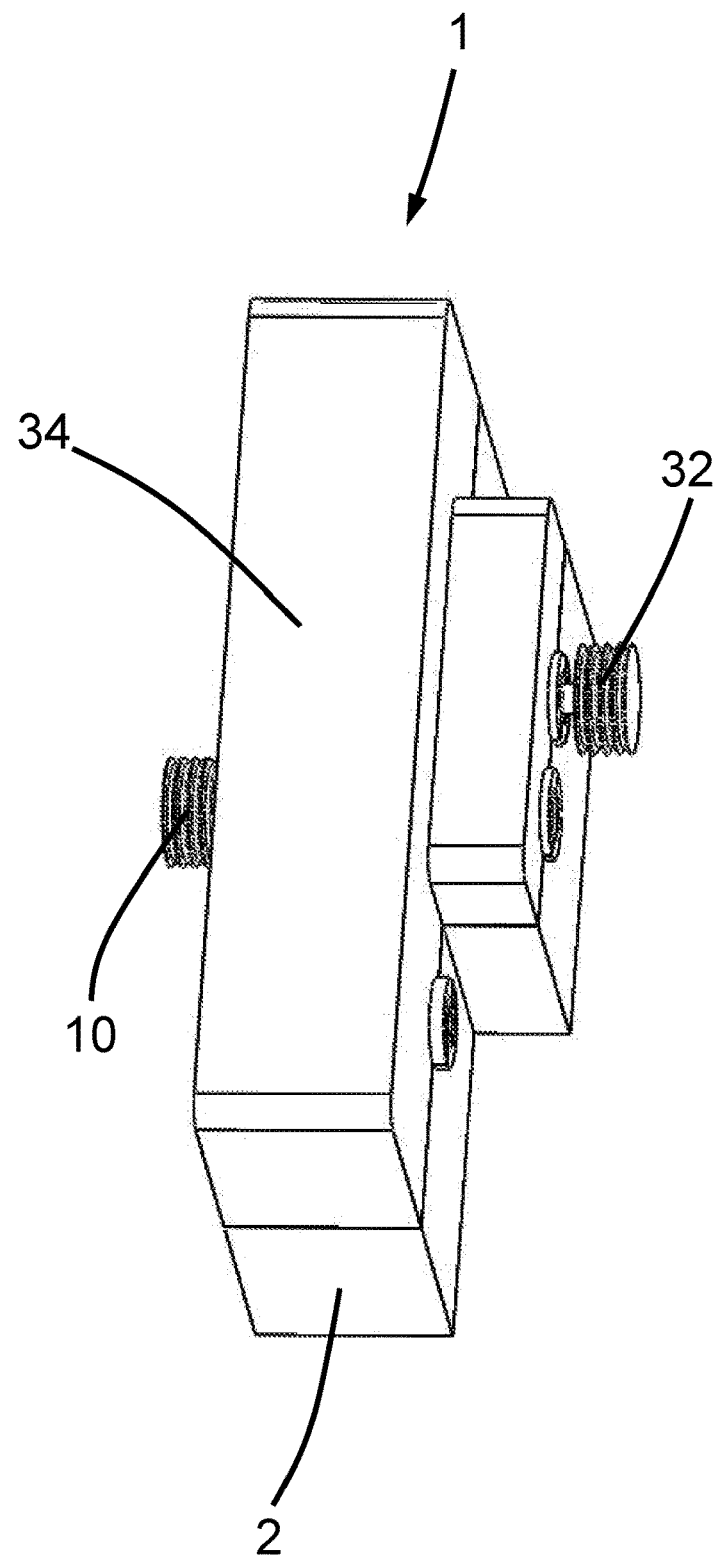
FIG. 7 is an isometric view of the present invention in an assembled form.

The upper frame 34, as shown in FIG. 7, is the support structure and cover for the present invention PIC 1.

In an alternative embodiment of the present invention PIC 35, FIGS. 8, 9, 10, 11, and 12 depict the lower frame 36, primary shaft assembly 42, and the flywheel assembly 22. The configuration of the alternative version of PIC 35 does not have the output assembly 26. The input and output rotational speeds are the same for the configuration of the alternative version of the present invention PIC 35.

It should be appreciated that the teachings and features of the alternative embodiments can be adapted for each embodiment.

Figure 8:
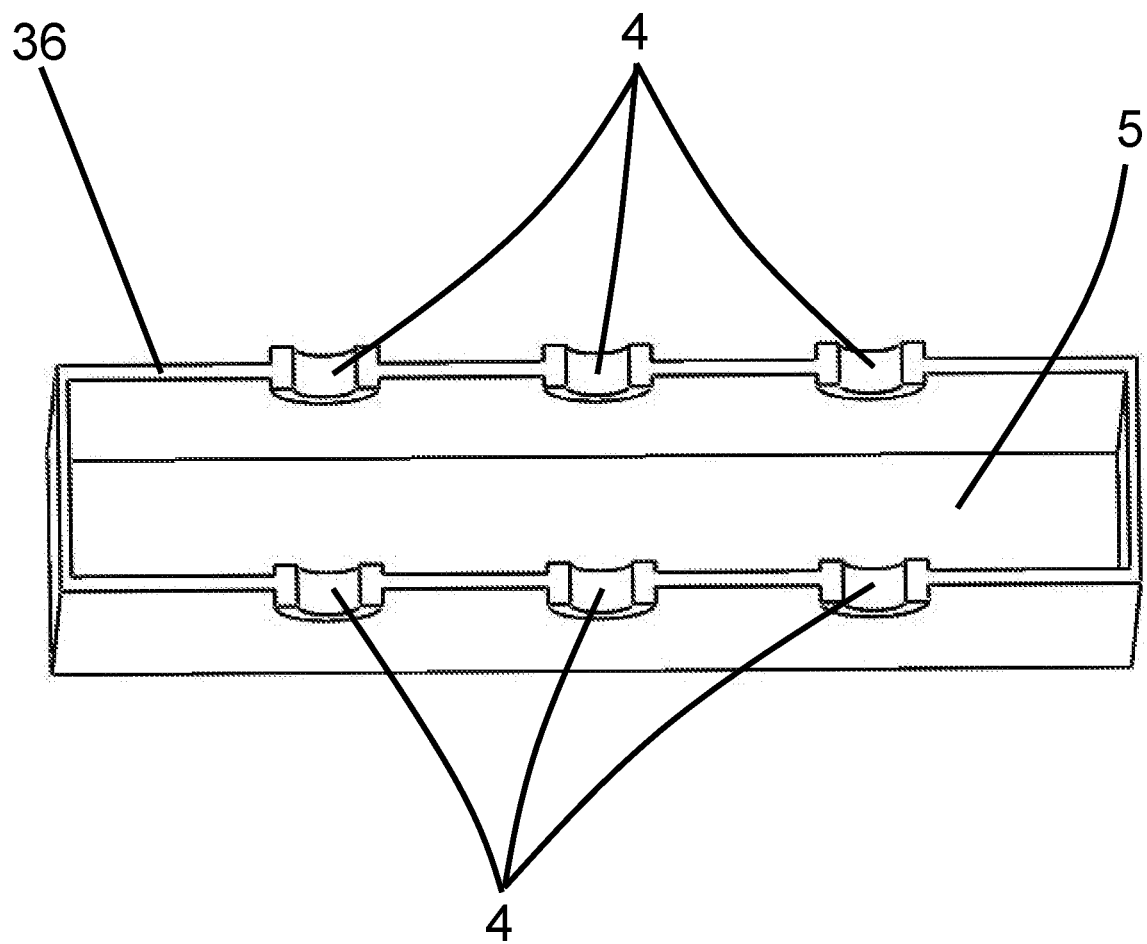
FIG. 8 is an isometric view of a lower frame of an alternative embodiment of the present invention.
Figure 9:
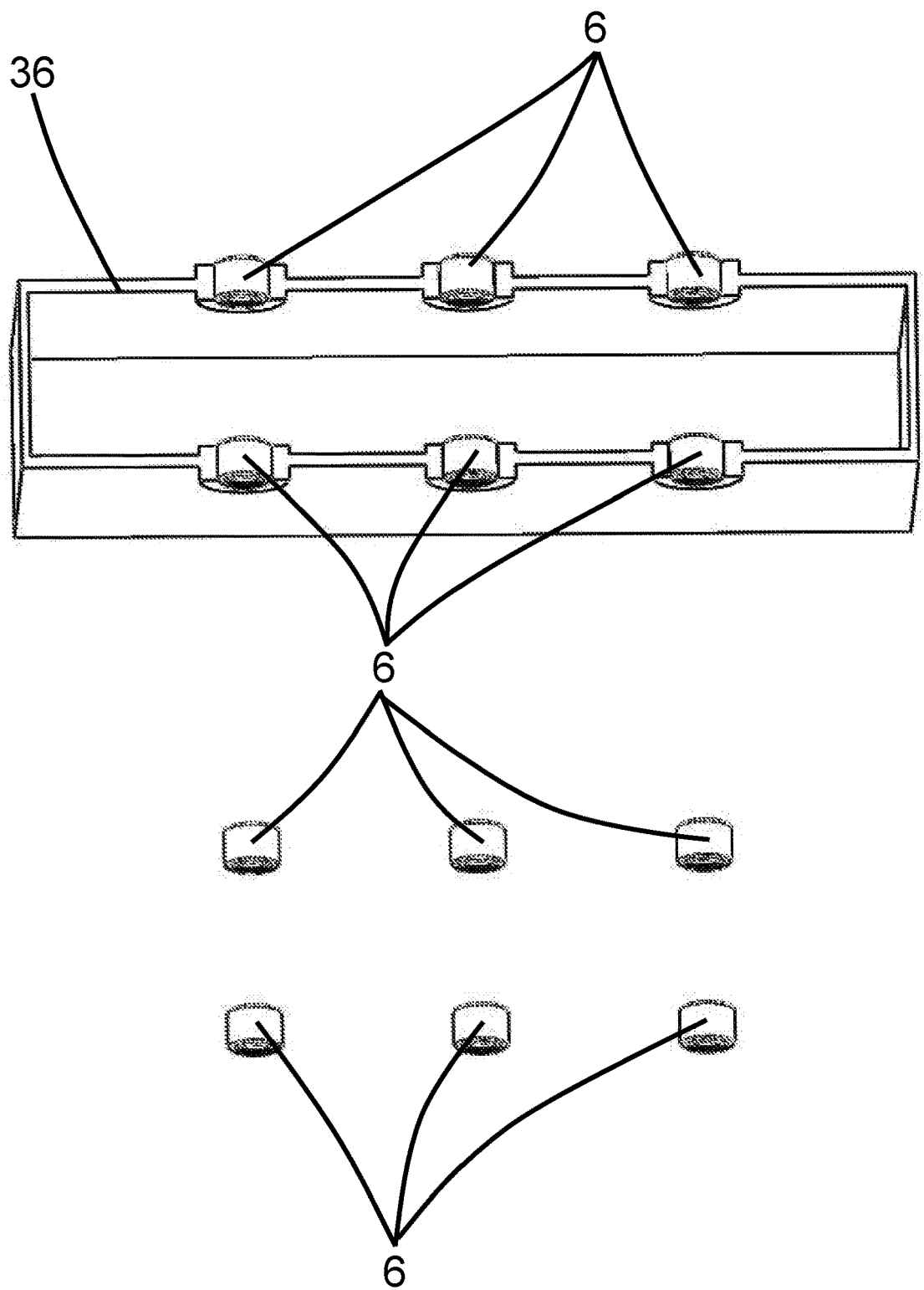
FIG. 9 is an isometric view of bearings and the bearings as assembled in an alternative embodiment of the present invention.

The lower frame 36, as shown in FIG. 8, is the support structure and casing of the alternative version of the present invention PIC 35. The base 5 of the frame 36 is secured to the base 65 of the oil well pumpjack 98. The frame 36 has bearing mounts 4 for the bearings 6 for the primary shaft assembly 42 and the flywheel assembly 22. The plurality of bearings 6, as shown in FIG. 9, enable the primary shaft assembly 42 and flywheel assembly 22 to freely rotate about their respective axes with small energy losses.

Figure 10:
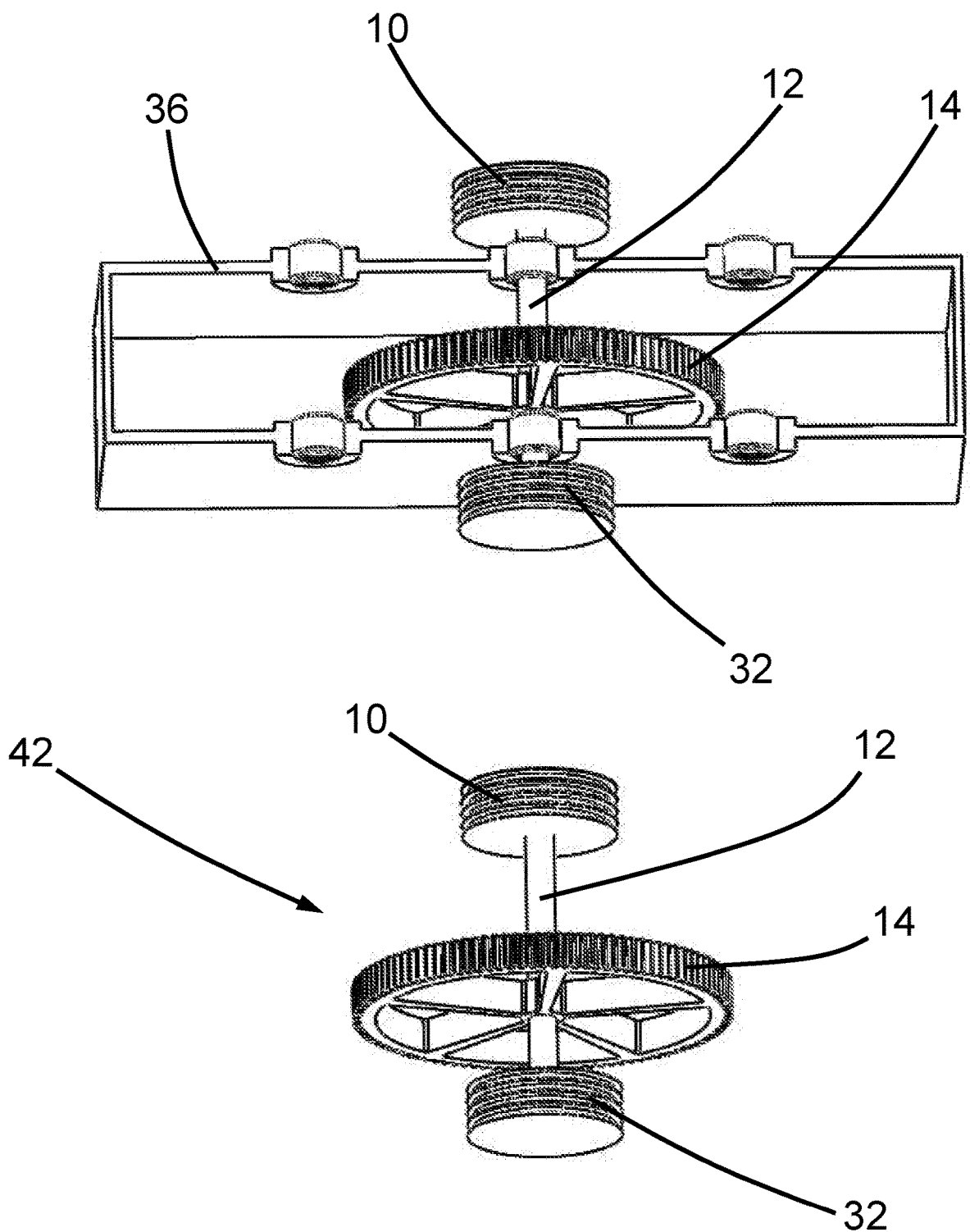
FIG. 10 is an isometric view of a primary shaft assembly and the primary shaft assembly as assembled in the alternative embodiment of the present invention.

The primary shaft assembly 42, as shown in FIG. 10, transfers power and torque between the prime mover 66, the flywheel assembly 18, and gearbox 70. The primary shaft assembly 42 consists of the multi-groove pulley 10, the input shaft 12, primary gear 14, and the multi-groove pulley 32. The multi-groove pulley 10 with the V-belt 69 and multi-groove pulley 67 transfer power and torque between the alternative present invention PIC configuration 35 and the prime mover 66. The input shaft 12 is the rotating straight bar for transmitting motion, torque, and power between the multi-groove pulley 10, the primary gear 14, and the multi-groove pulley 32. The input shaft 12 is connected to the frame 36 by bearings 6. The primary gear 14 is fixed to the input shaft 12 and is coupled with the flywheel gear 24. The multi-groove pulley 32 is fixed to the input shaft 12 and is coupled with the gearbox 70 by the V-belts 73.

Figure 11:
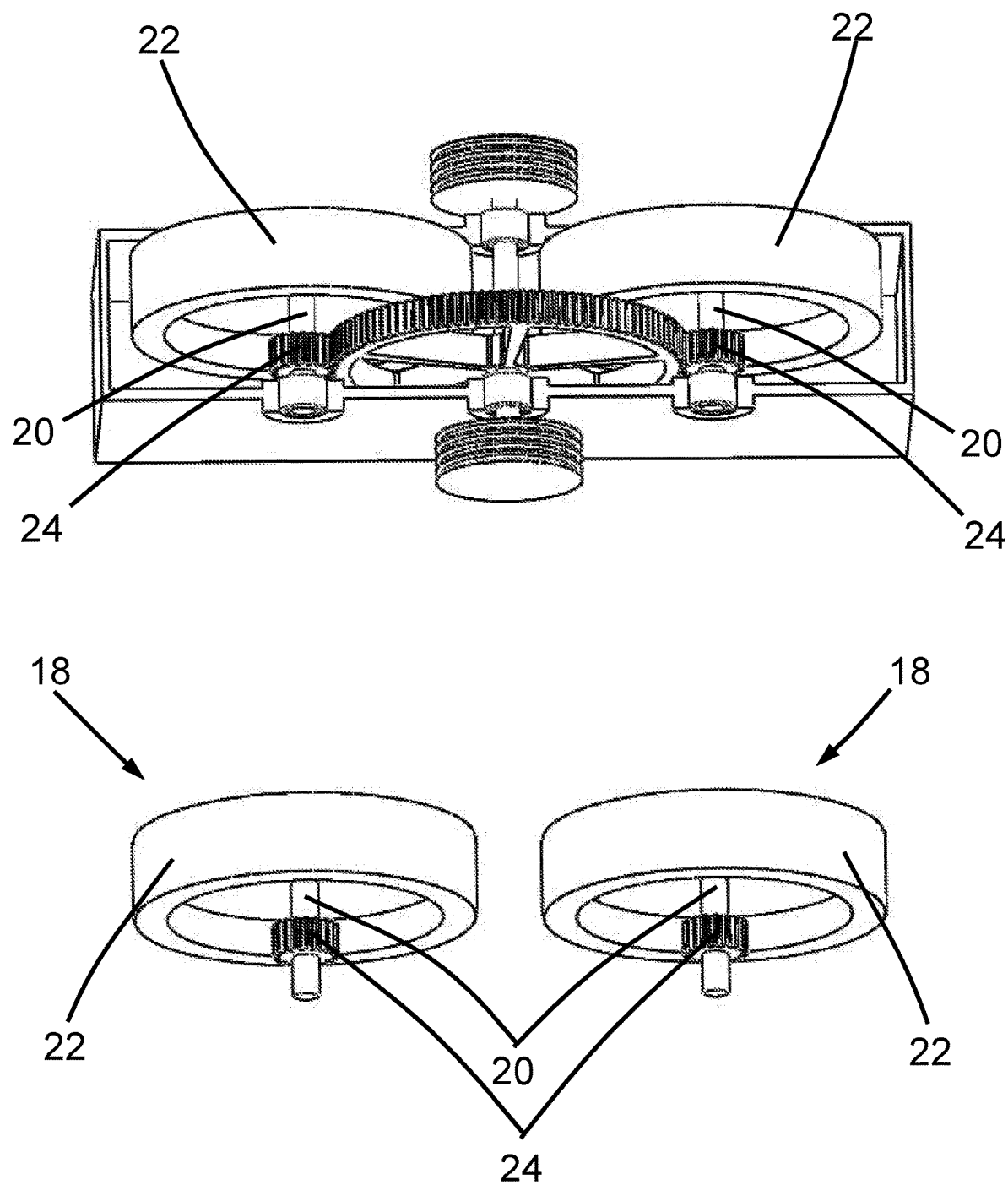
FIG. 11 is an isometric view of a flywheel assembly and the flywheel assembly as assembled in the alternative version of the present invention.

The alternative embodiment of the present invention PIC configuration 35 has one or more flywheel assemblies 18, as shown in FIG. 11. The flywheel assembly 18 is the inertia capacitor, which has ample kinetic energy to smooth the transition of power and torque between the prime mover 66 and the gearbox 70. The flywheel assembly 22 consists of the flywheel shaft 20, the flywheel 22, and the flywheel gear 24. The flywheel shaft 20 is a rotating straight bar for transmitting motion, torque, and power between the flywheel 22 and the flywheel gear 24. The flywheel shaft 20 is connected to the frame 36 by bearings 6. The speed ratio of the primary gear 14 and the flywheel gear 24 increases the rotational velocity of the flywheel assemblies 18 with respect to the rotational velocity of the primary shaft assembly 42.

Figure 12:
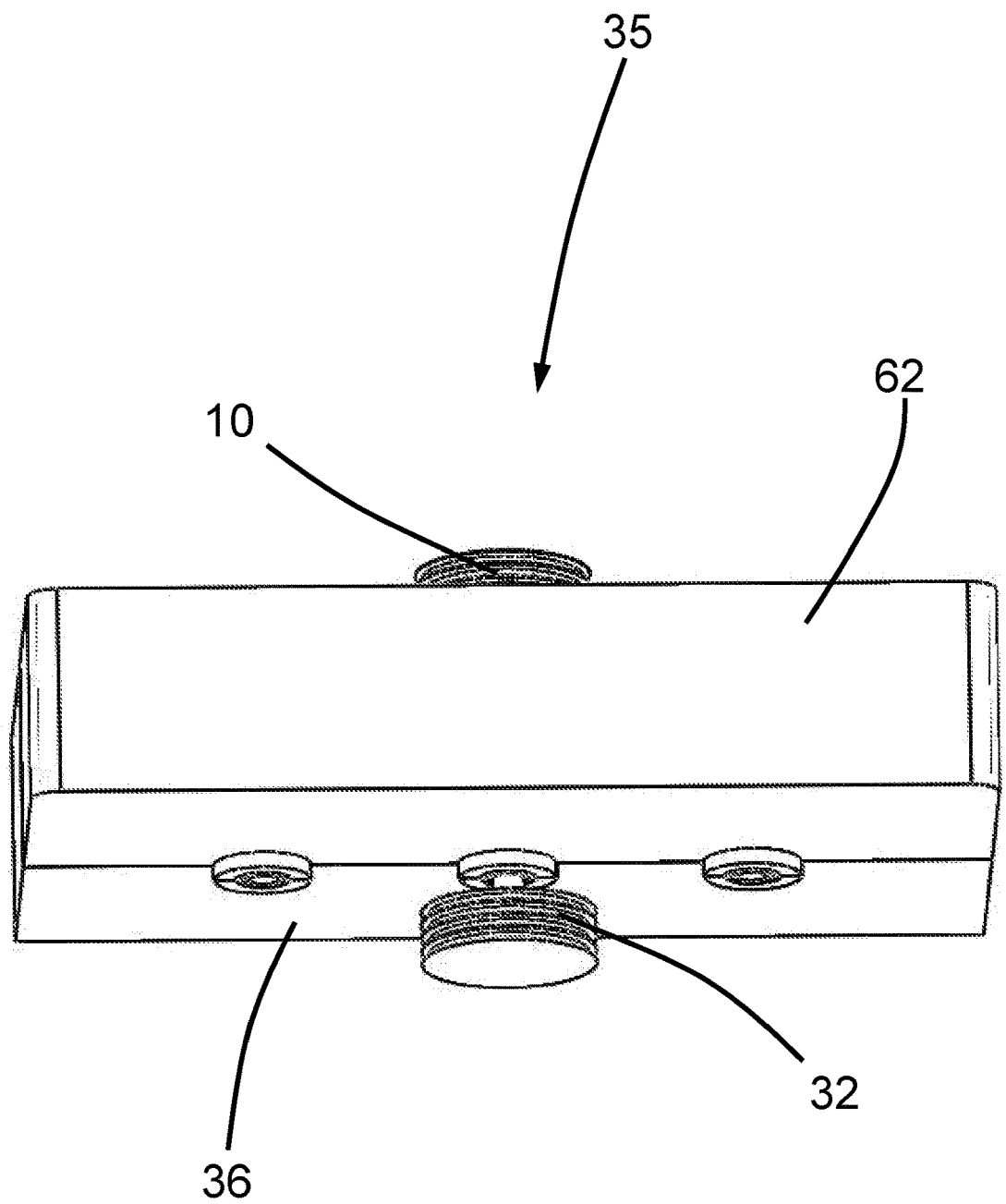
FIG. 12 is an isometric view of the completely assembled invention in the alternative version of the invention.

In FIG. 12, an isometric view of the completely assembled alternative embodiment of the present invention is shown.

Figure 13:
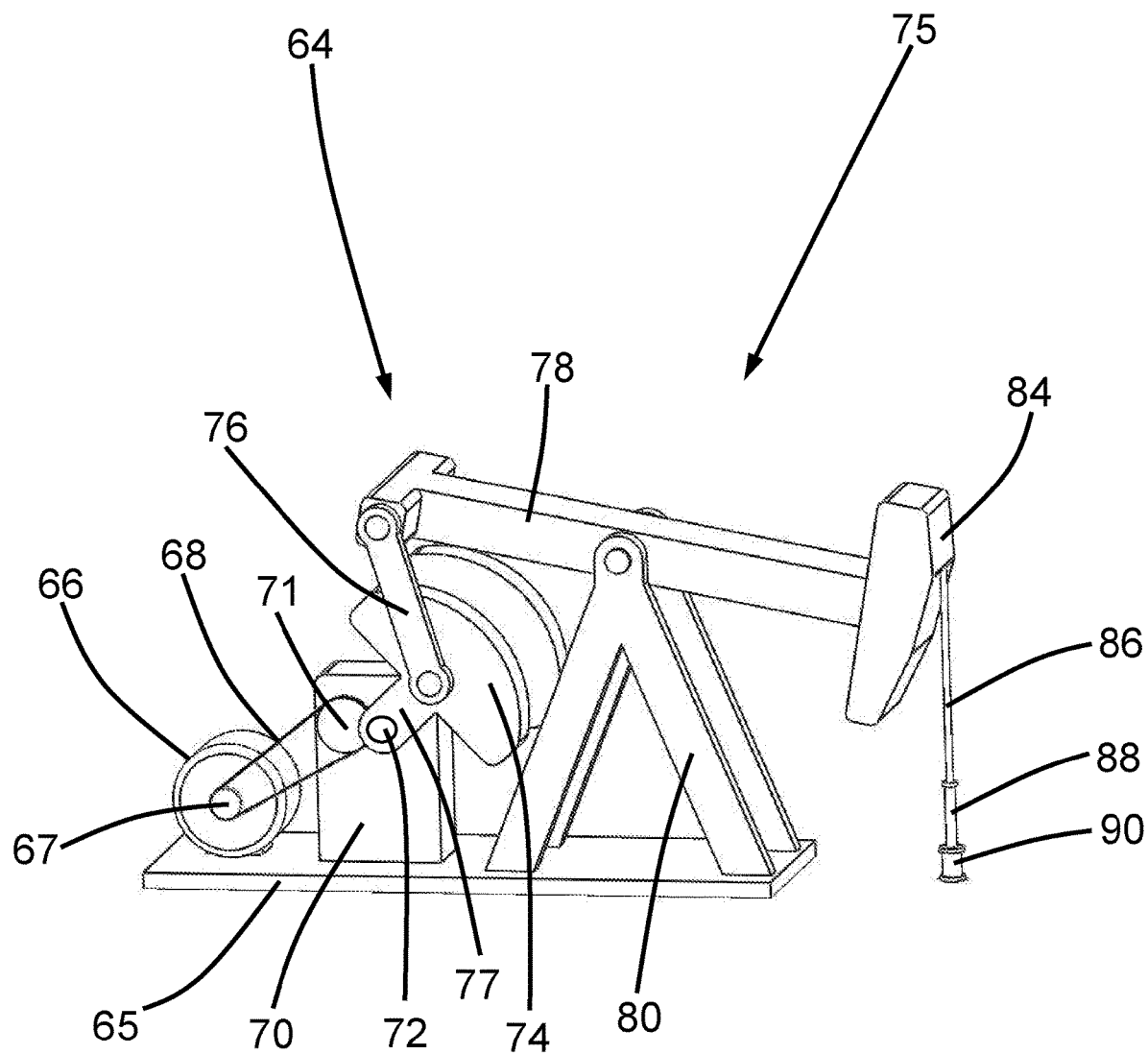
FIG. 13 is an isometric view of a conventional oil well pumpjack.
Figure 14:
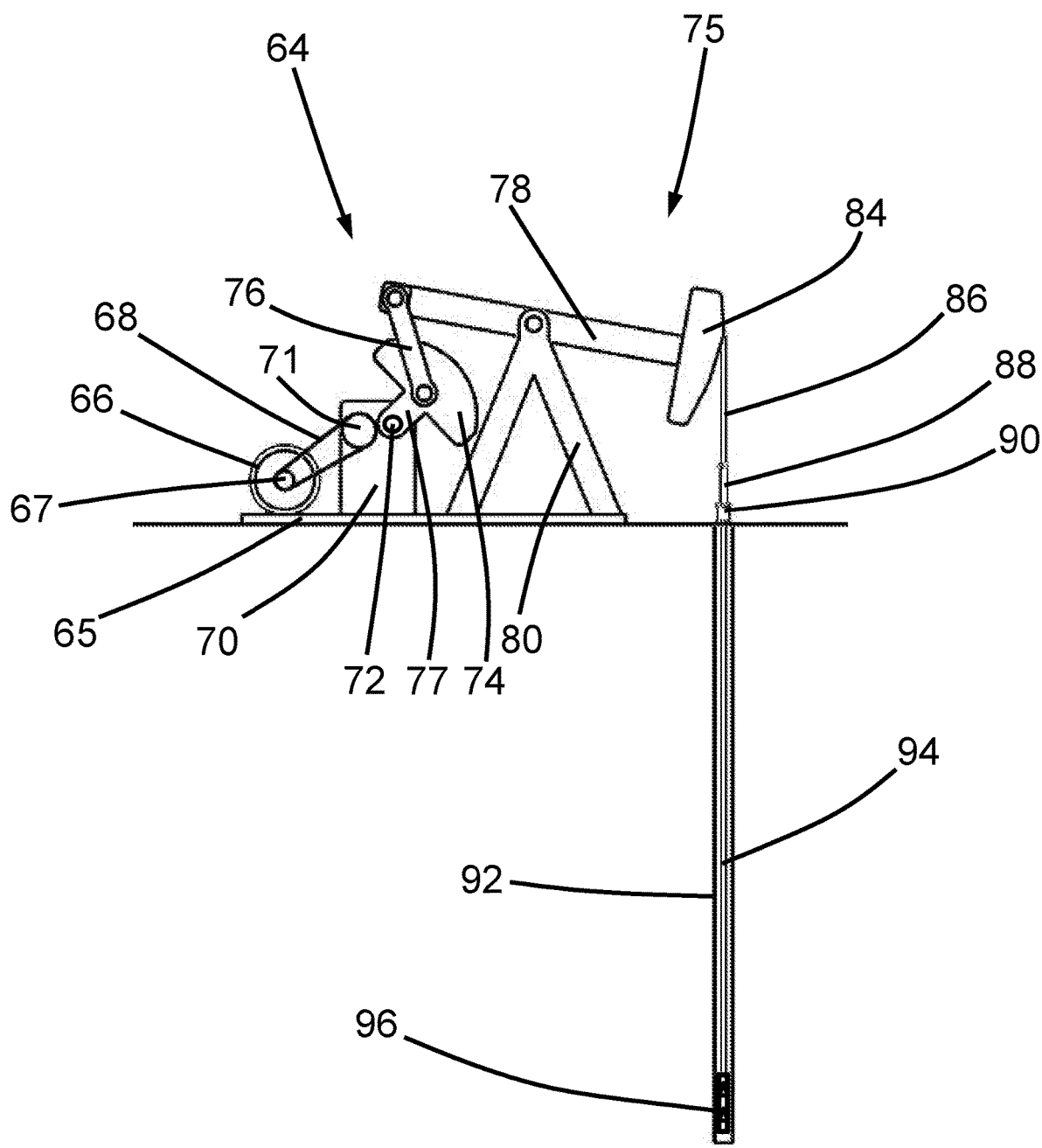
FIG. 14 is a side view of a conventional oil well pumpjack.

A conventional oil well pumpjack 64, is shown in FIGS. 13 and 14 as prior art. A conventional oil well pumpjack 64 is a machine designed specifically for sucker rod string 94 pumping of oil. The prime mover 66 is mounted on the base 65 of the oil well pumpjack 64 to power a rotating crank 77. The crank 77 moves the walking beam 78 up and down to produce reciprocating motion. This reciprocating motion operates the subsurface pump 96.

The oil well pumpjack 64 has five major components, which are the prime mover 66, the gearbox 70, the pumping unit 75, the sucker rod string 94, and the subsurface pump 96. The prime mover 66 provides power to the system. The gearbox 70 reduces the speed of the prime mover 66 to a suitable pumping speed. The pumping unit 75 translates the rotating motion of the gear reducer and prime mover 66 into a reciprocating motion. The pumping unit 75 consists of counter weight 74, crank 77, pitman's arms 76, walking beam 78, horse head 84, sampson post 80, base 65, bridle 86, polished rod 88, and casing head 90. The sucker rod string 94 is located inside the production tubing 92 and transmits the reciprocating motion of the pumping unit 75 to the subsurface pump 96. The subsurface pump 96 lifts the oil out of the ground through the production tubing 92.

There are multiple types of pumping unit 75 designs for pumping oil using sucker rod strings 95 for which the present invention PIC 1, 35 can be applied.

Figure 15:
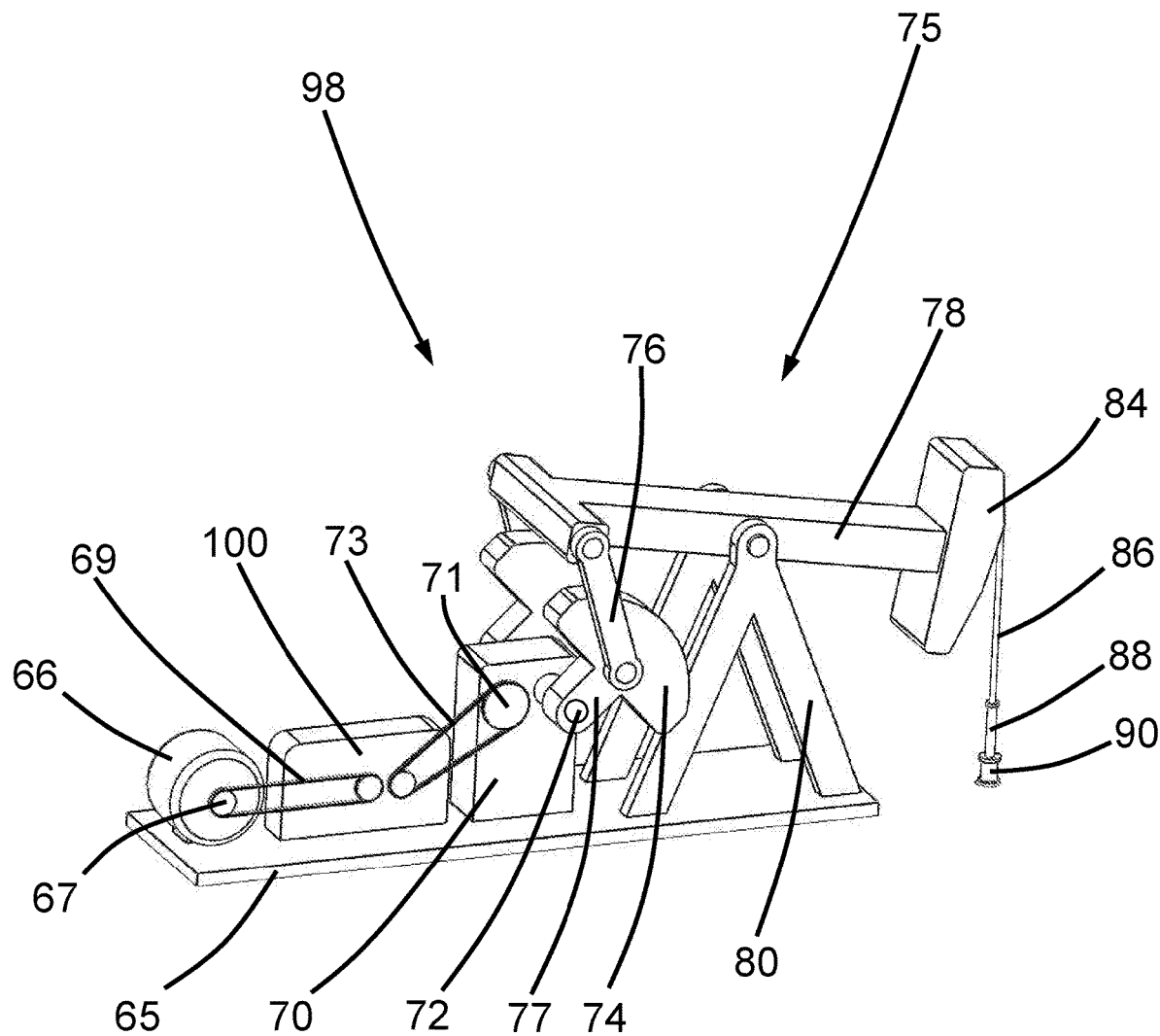
FIG. 15 is an isometric view of an oil well pumpjack with the present invention.
Figure 16:
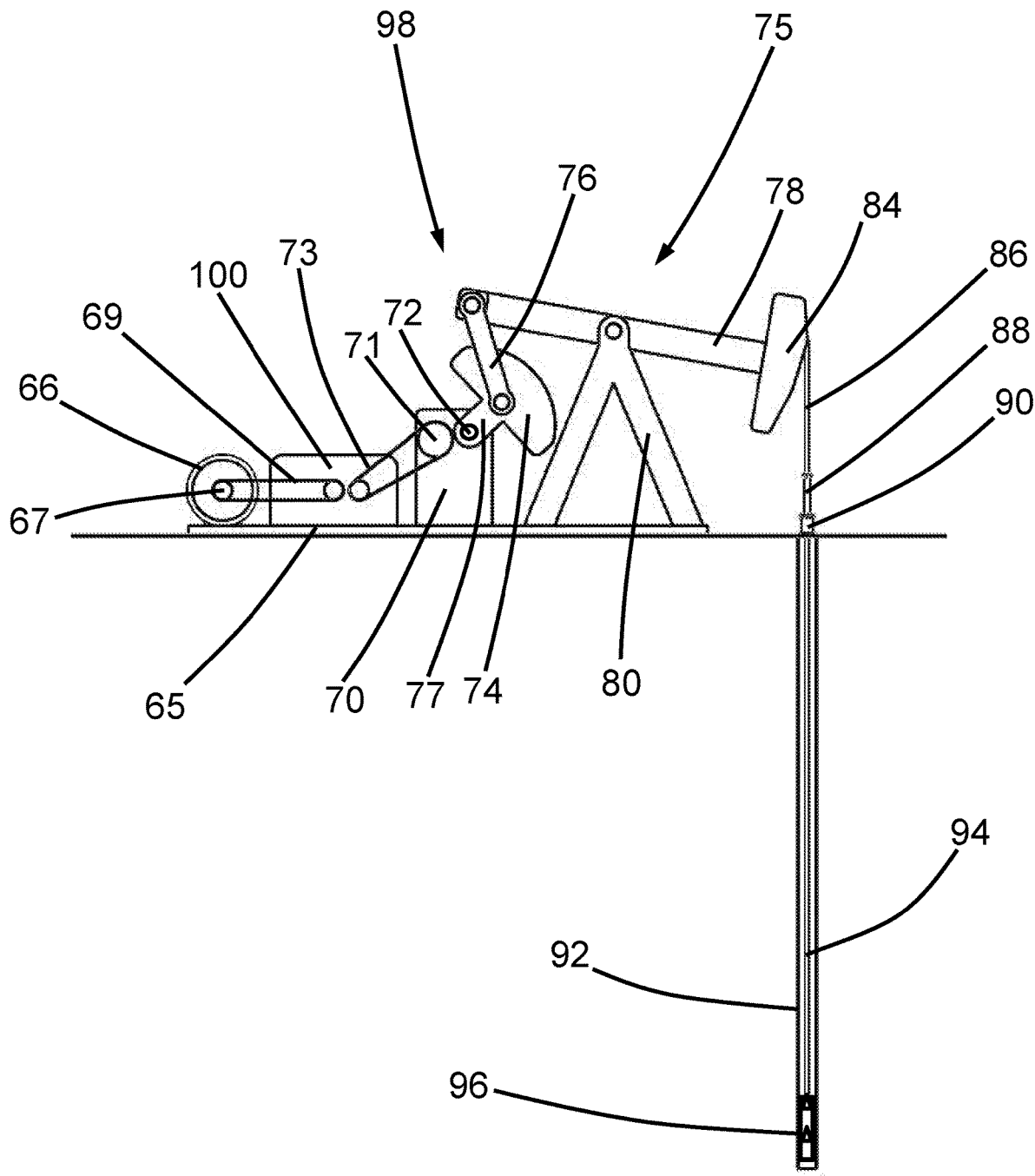
FIG. 16 is a side view of an oil well pumpjack with the present invention.
Figure 17:
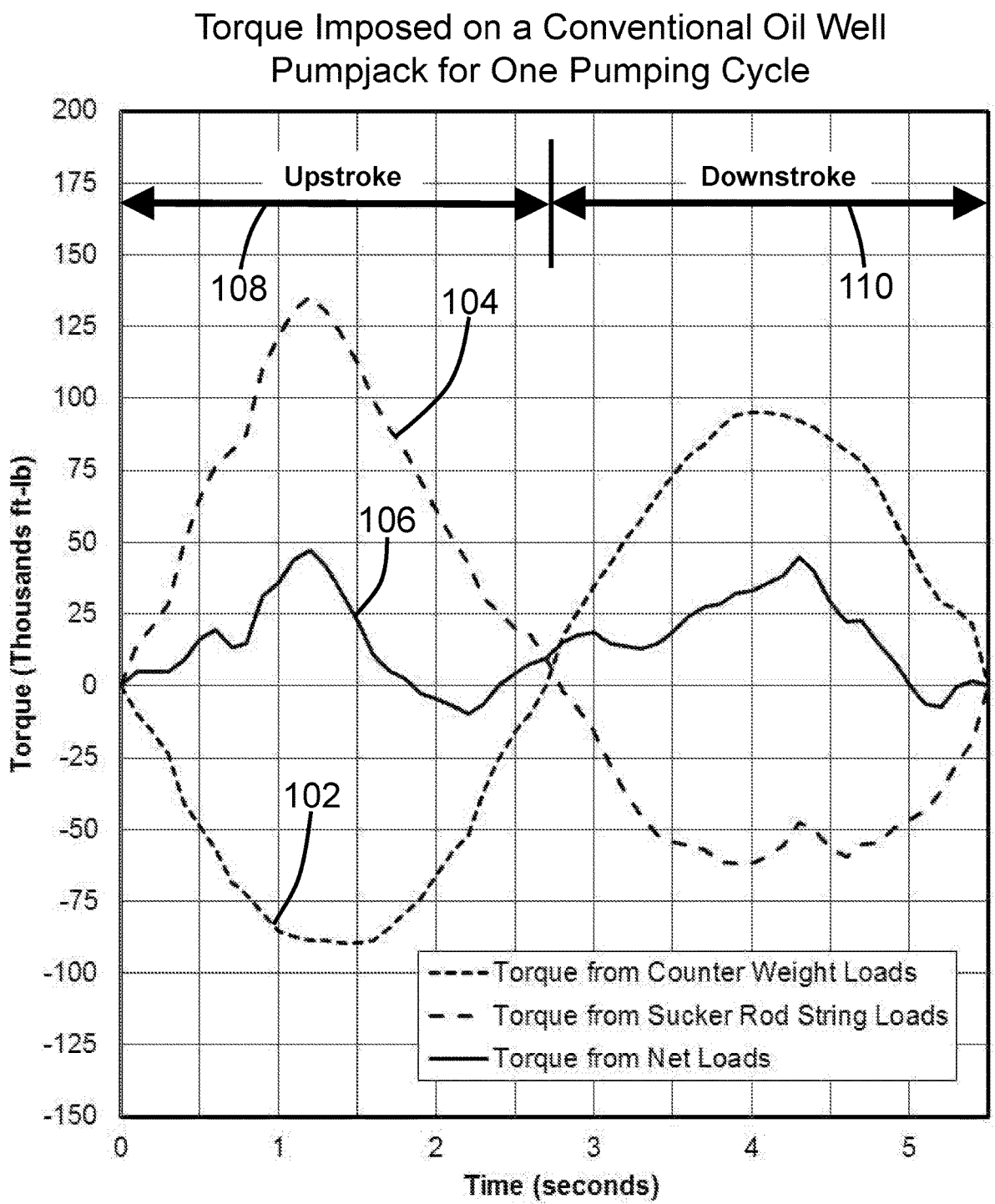
FIG. 17 is a plot of the torque imposed on a conventional oil well pumpjack for one pumping cycle.
Figure 18:
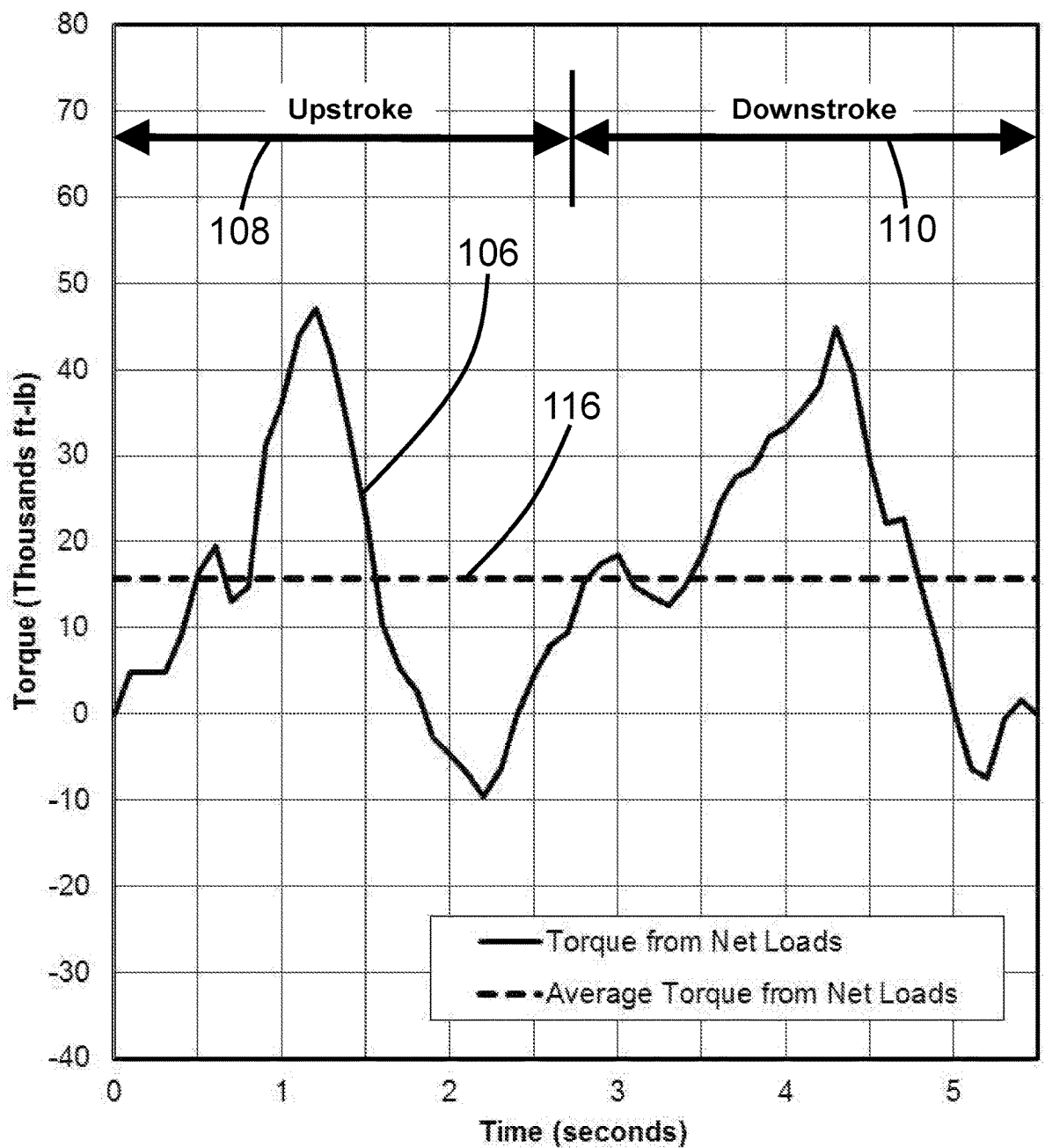
FIG. 18 is a plot of the net and average torque imposed on a conventional oil well pumpjack for one pumping cycle.
Figure 19:
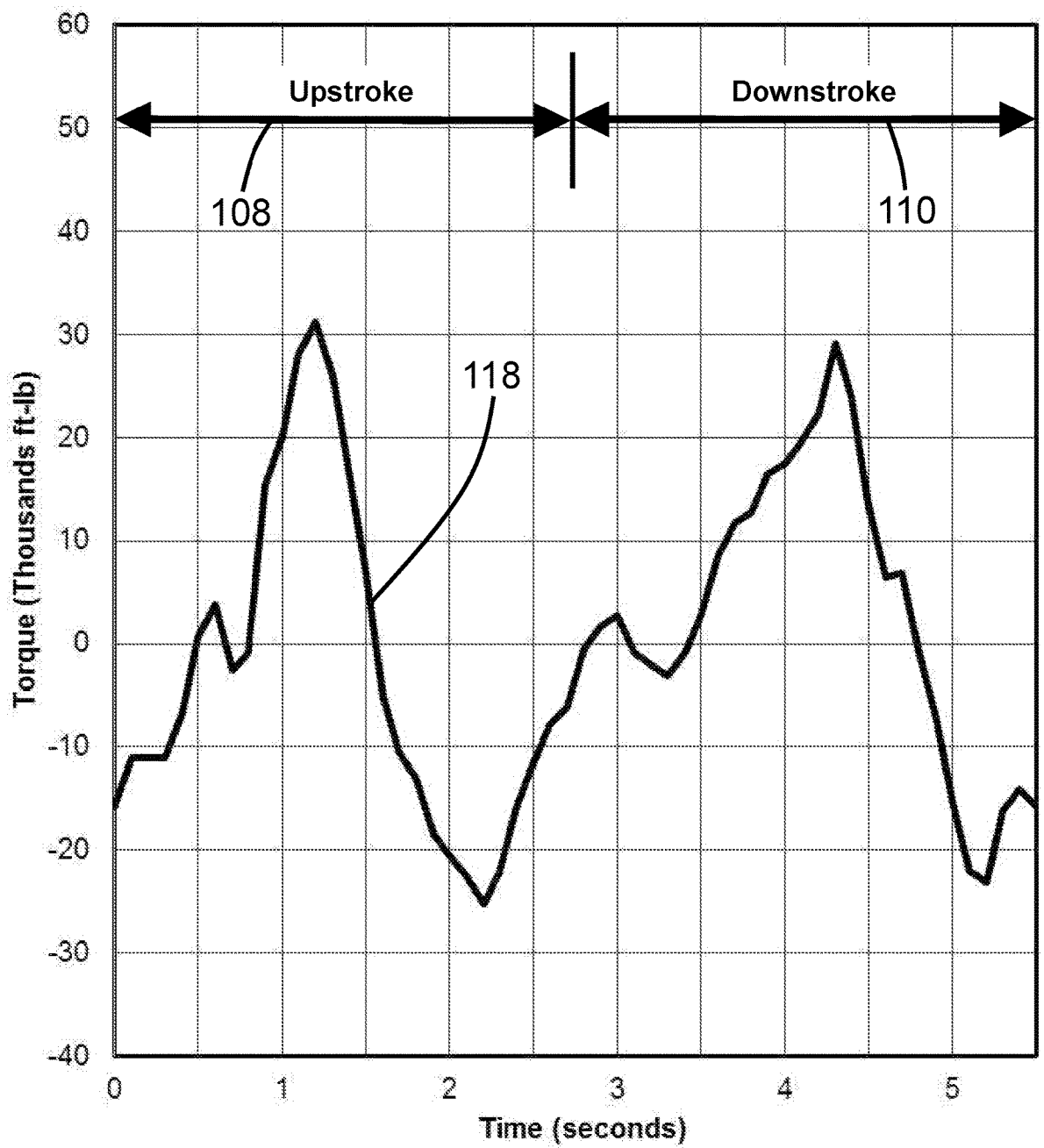
FIG. 19 is a plot of the net minus average torque imposed on a conventional oil well pumpjack for one pumping cycle.

In FIGS. 15 and 16, the present invention 100 is shown in use with a pumpjack.

The present invention PIC 1, 35, 100 has the kinetic energy (KE) capacity to facilitate the optimal transfer of power throughout the oil well pumpjack for each pumping cycle. The flywheel 22 enables the prime mover 66 to operate at a near constant speed and near constant power for utmost efficiency. Feedback torque from the oil well pumpjack 64, 98 to the prime mover 66 is eliminated. The present invention PIC 1, 35, 100 reduces the severity of the shock loads from each pumping cycle, which increases the service life of the oil well pumpjack 64, 98.

The flywheel 22 is a rotating mechanical device that is used to store rotational energy, which is called Kinetic Energy (KE). The flywheel 22 is also known as an inertia capacitor. The flywheel 22 has a significant moment of inertia and thus resists changes in rotational speed. The amount of energy stored in a flywheel is proportional to the square of its rotational speed ($\omega$). Energy is transferred to a flywheel by applying torque to it, thereby increasing its rotational speed and hence its stored energy. Conversely, the flywheel 22 releases stored energy by applying torque to a mechanical load, thereby decreasing its rotational speed. The energy stored in a flywheel is known as Kinetic Energy (KE).

The Kinetic Energy (KE) of a flywheel is equal to the product of one-half the flywheel's Mass Moment of Inertia, and the flywheel's rotational speed squared ($\frac{1}{2} I \omega^2$). The Mass Moment of Inertia (I) is the mass property of a rigid body that determines the torque needed for a desired angular acceleration about an axis of rotation. The flywheel rotational speed ($\omega$) is the angular speed of the flywheel rotating about its axis.

The torque and energy for a conventional oil well pumpjack for one pumping cycle are shown in FIGS. 17, 18, 19, and 20. Torque is calculated at the gearbox power shaft 72. Torque for the pumping unit 75 is generated from the counter weight 74 loads and the sucker rod string 94 loads. Net torque 106 is the sum of the counter weight torque 102 and the sucker rod string torque 104, which is a dynamic type of torque. Net torque 106 has both positive and negative torques where the negative torque is referred to as the feedback torque. The average torque 116 is the average of net torque 106. Net torque 106 minus the average torque 116 is the dynamic torque 118 which must be overcome for near constant speed and smooth operation of the oil well pumpjack 64, 98.

In a conventional oil well pumpjack 64 the prime mover 66 is insufficient alone for the oil well pumpjack 64 to operate at a near constant speed and smooth operation. The prime mover 66 continuously changes torque amplitude and direction by continuously switching between motor and generator modes of operation to match net torque 106. A prohibitively expensive and high torque prime mover 66 would be required for the oil well pumpjack 64 to operate at a near constant speed.

The present invention PIC 1, 35, 100 enables the prime mover 66 to operate at average net torque 116 while transferring to the pumping unit 75 the required torque to overcome net torque 106 so that the oil well pumpjack 98 can operate smoothly at a near constant speed. This improvement allows the upstrokes and downstrokes of the sucker rod string 94 pumping cycle to be conducted smoothly, thereby reducing shock loads to the sucker rod string 94. In addition, a less expensive and lower torque prime mover 66 can be used for the oil well pumpjack 64 to operate at a near constant speed.

Figure 20:
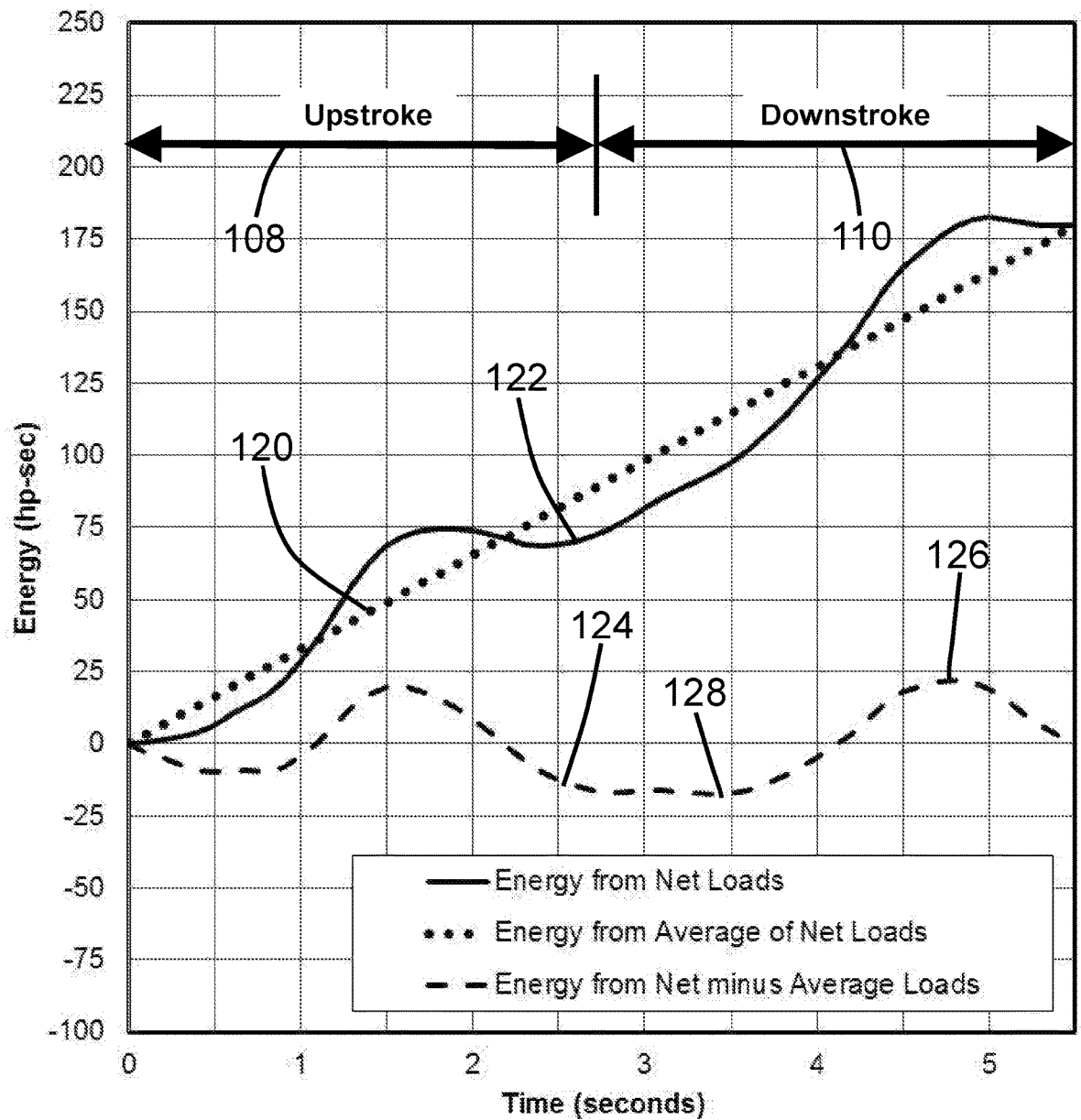
FIG. 20 is a plot of the energy for a conventional oil well pumpjack for one pumping cycle.

In the following example, net torque energy 120 and average torque energy 122 for one pumping cycle is 180 horsepower-seconds (hp-sec) at 5.5 seconds, FIG. 20. The time duration for one pumping cycle in FIGS. 17, 18, 19, and 20 is 5.5 seconds and the pumping unit 75 operating speed is 10.9 pumping cycles per minute. The required prime mover 66 would need to be 32.8 horsepower (hp) for delivering constant power to the pumping unit 75, which is 180 hp-sec divided by 5.5 seconds.

The change in the amount of Kinetic Energy that is stored in the present invention PIC 1, 35, 100 during a pumping cycle would be the maximum value 126 and the minimum value 128 of net energy minus average energy 124 in FIG. 20, which is 22 hp-sec and −17 hp-sec. The Kinetic Energy in the flywheels 22 must be large enough so that a Kinetic Energy change of 22 hp-sec would result in a small change in the speed of the flywheels 22.

Figure 21:
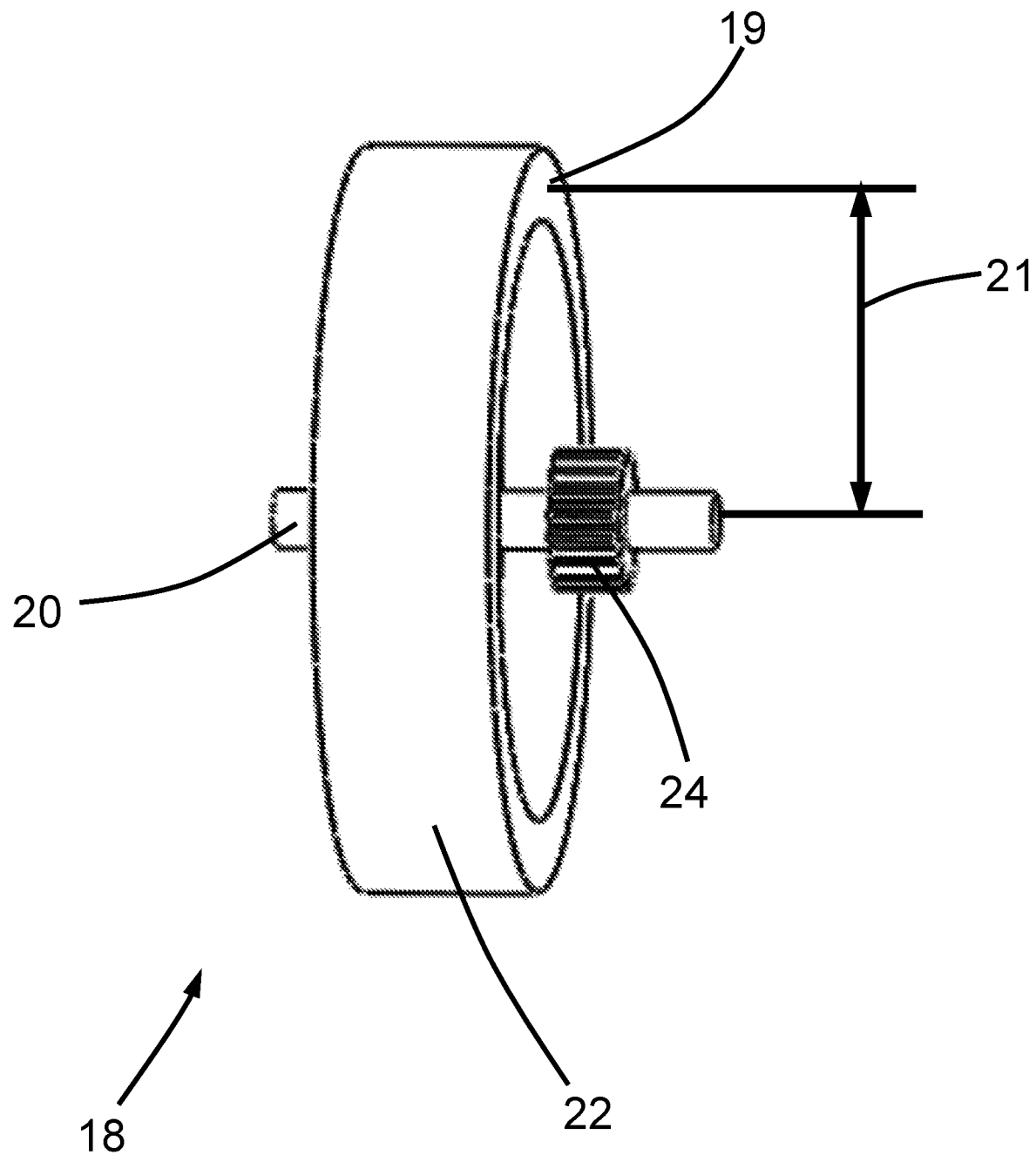
FIG. 21 is an isometric view of the flywheel assembly identifying the rim and rim radius of the present invention.

Assuming the rotational speed of the prime mover 66 and the primary shaft assembly 8, 42 was 1200 revolutions per minute (rpm) and the speed ratio of the primary gear 14 and the flywheel gear 24 was 6 to 1, then the rotational speed of the flywheels 22 would be 7200 rpm. Assuming the flywheels 22 have a total rim mass 19 of 300 pounds (lb) and a rim radius 21 of 9 inches, shown in FIG. 21, then the Kinetic Energy of the flywheels 22 would be 2710 hp-sec. A 22 hp-sec change in the Kinetic Energy of the flywheels 22 would result in a 0.4 percent change in the rotational velocity of the flywheels 22. A 0.4 percent change in the operating speed of the oil well pumpjack 98 during a pumping cycle is considered to be a near constant operating speed.

Assuming the weight of the counter weight 74 is 10,000 lb, the length of the crank 76 is 9.5 feet, and the rotational speed of the counter weight 74 is 10.9 rpm, then the Kinetic Energy of the counter weight is 33 hp-sec. The Kinetic Energy of the sucker rod string 94 is cyclic and would have a maximum Kinetic Energy value that is similar to the counter weight 74 of 33 hp-sec. The maximum total Kinetic Energy value of the counter weight 74 and sucker rod string 94 would be 66 hp-sec, which is small relative to the Kinetic Energy of the flywheels 22 of 2,710 hp-sec, and the ratio of 2,710 hp-sec and 66 hp-sec is 41. The Kinetic Energy of the flywheels 22 in the present invention PIC 1, 35, 100 are at least 5 times greater than the total Kinetic Energy of prior art oil well pumpjacks 64. This factor of 5 is the minimal amount of increase in Kinetic Energy that can be produced by the PIC 1, 35, 100, but significantly greater amounts of Kinetic Energy can be attained with it.

Assuming the pumping unit 75 operating speed of 10.9 pumping cycles per minute needed to be changed to 4.0 pumping cycles per minute without changing the rotational speed of the prime mover 66 and the flywheels 22, then the change in the rate of the pumping cycles is accomplished by changing the speed ratio of the primary output gear 16 and the output gear 30.

Figure 25:
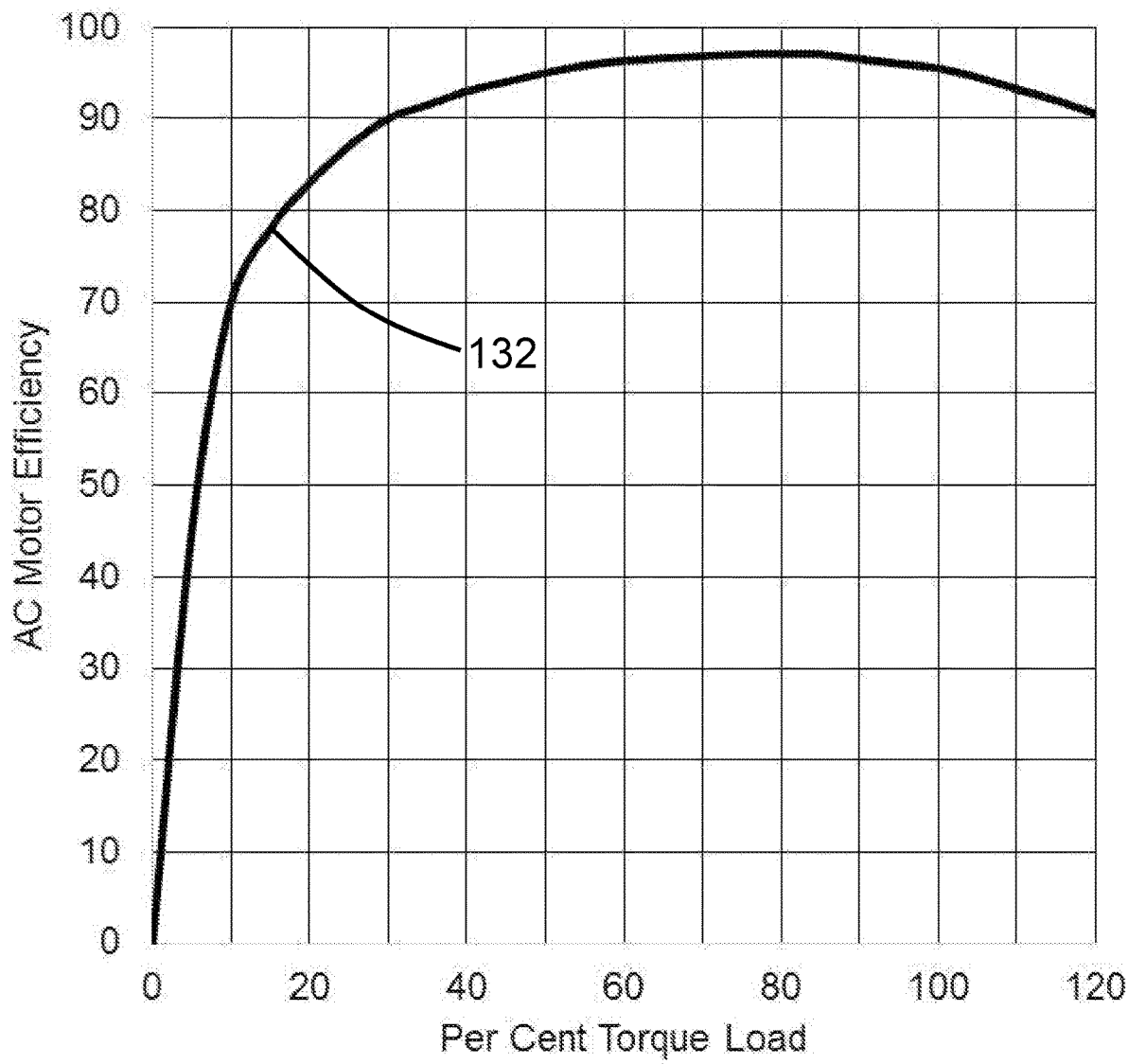
FIG. 25 is a plot of AC motor efficiency with respect to percent torque load.
Figure 26:
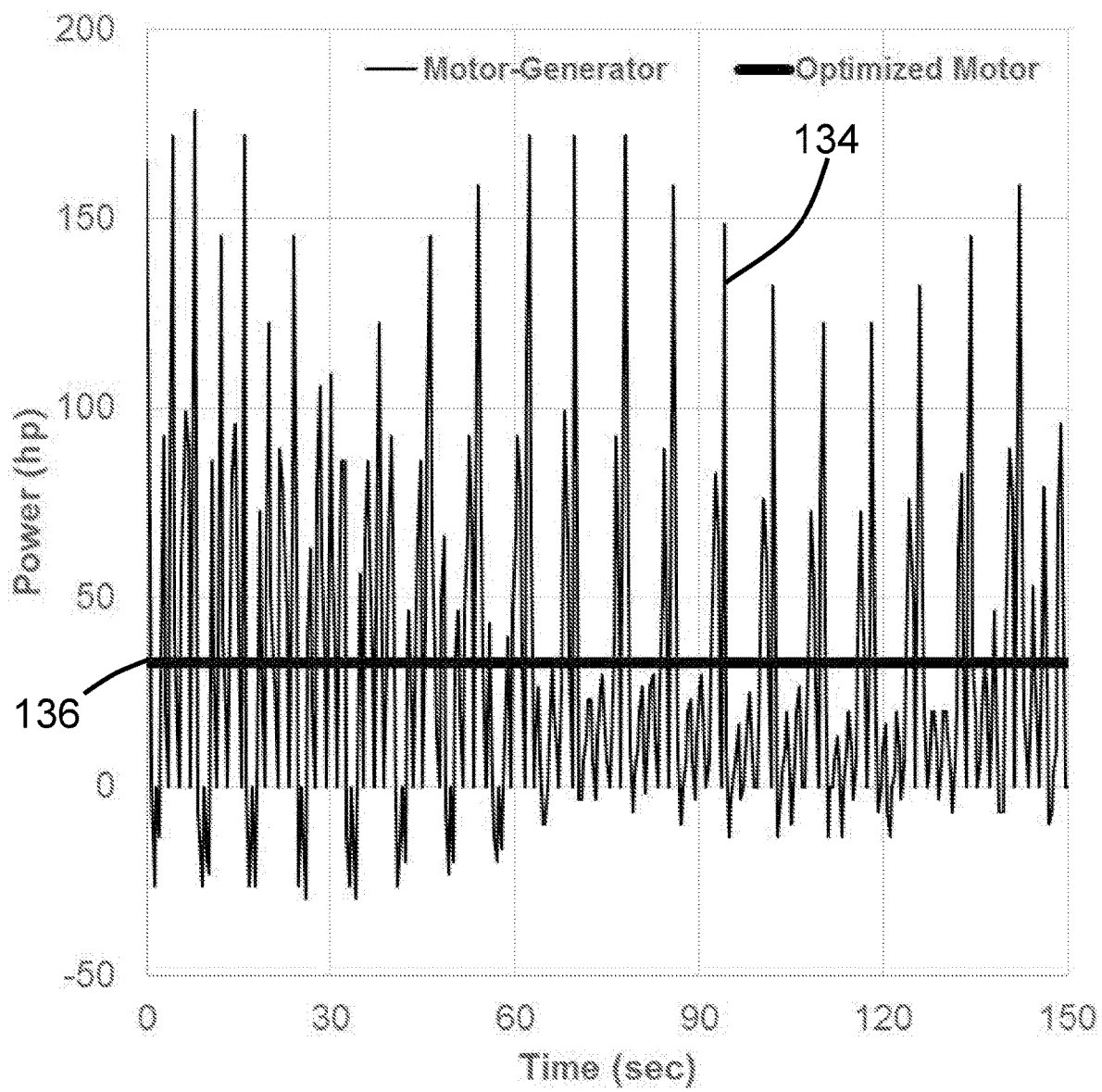
FIG. 26 is a time history plot of the power from an electric motor generator and an optimized electric motor.

The optimal size of the prime mover 66 is based on the energy demands of the oil well pumpjack 64 for each pumping cycle. Using an AC electric motor for the prime mover 66, the efficiency of an AC electric motor is dependent on the load acting on the AC electric motor as depicted in FIG. 25. Energy is wasted when an AC electric motor is not operating at optimal efficiency. A comparison of the power time history plots between an electric motor-generator and an optimized electric motor illustrates the benefit of the optimized electric motor to power the present invention PIC 1, 35, 100, as depicted in FIG. 26. The dynamic changes in the power of an electric motor-generator result in significant energy losses with respect to the power usage of the optimized electric motor.

Figure 22:
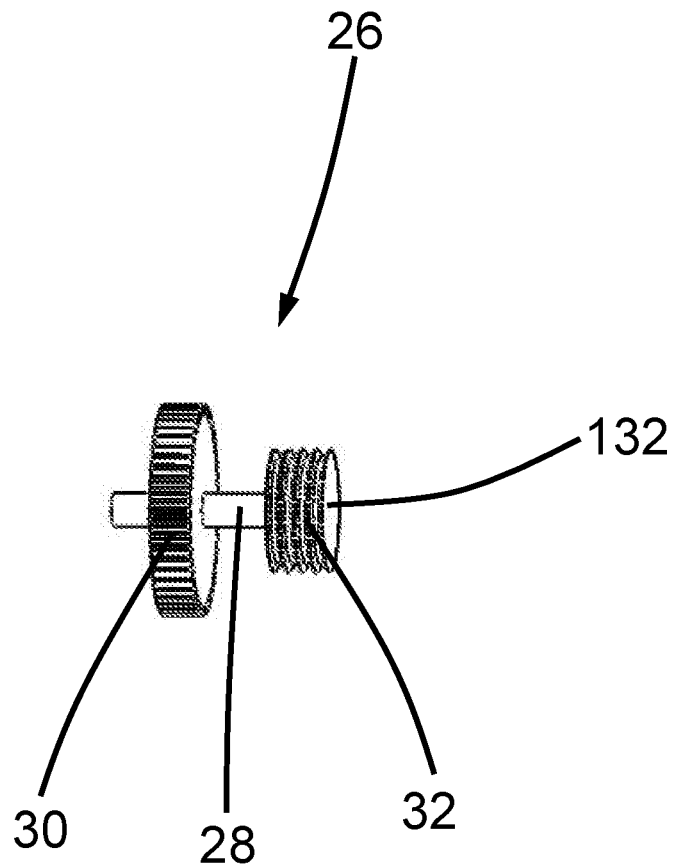
FIG. 22 is an isometric view of the output assembly identifying a clutch and/or torque converter in the multi-groove pulley in accordance with the present invention.
Figure 23:
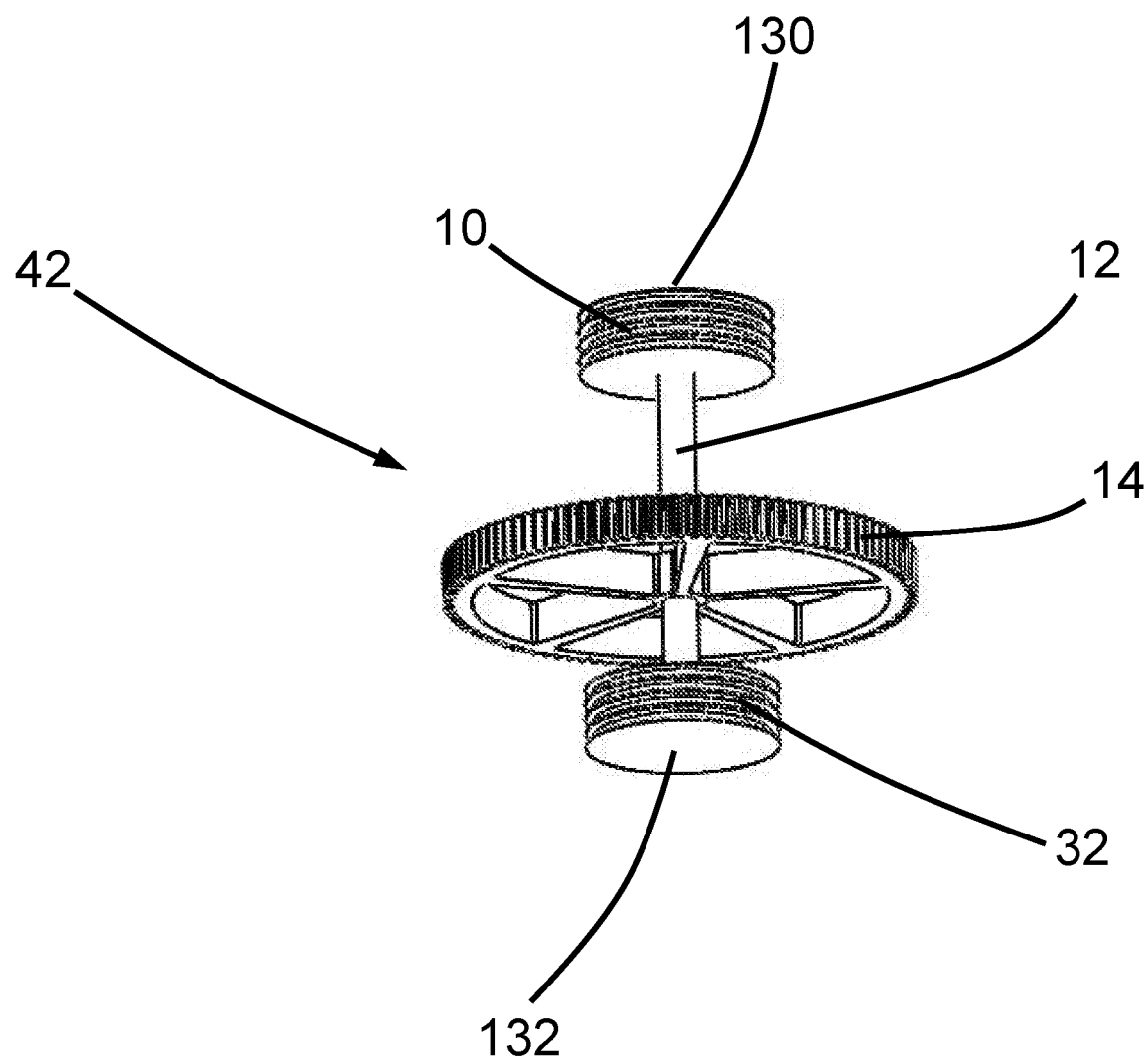
FIG. 23 is an isometric view of the alternative primary shaft assembly identifying a clutch and/or torque converter in multi-groove pulleys in accordance with the present invention.
Figure 24:
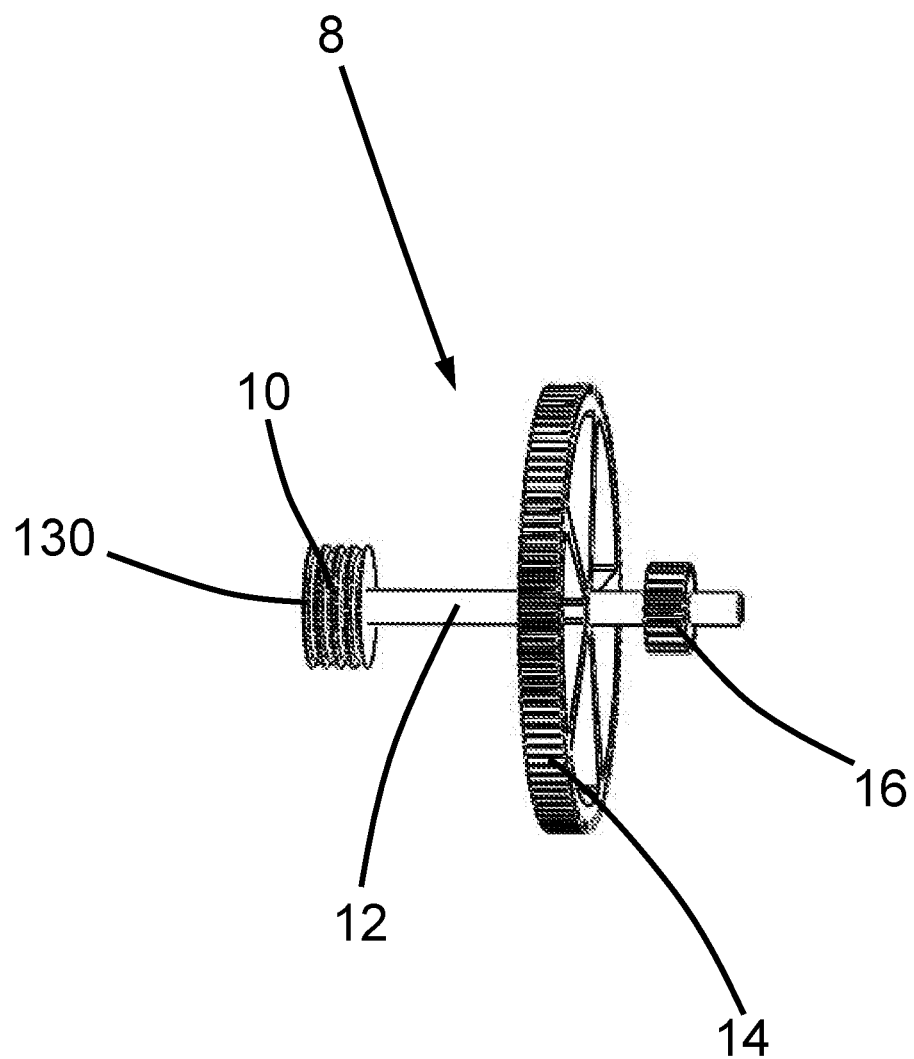
FIG. 24 is an isometric view of the primary shaft assembly identifying a clutch and/or torque converter in the multi-groove pulley in accordance with the present invention.

For an alternative embodiment, the clutches and/or torque converters 130, 132, as shown in FIGS. 22, 23, 24, are optional improvements used to facilitate a startup of the pumping unit 75 with a prime mover 66 of an optimal size for the pumping cycle. The clutches and/or torque converters 130, 132 are devices used to transfer rotational power and torque from a rotational power source to a rotating driven load which includes devices such as an infinitely variable transmission (IVT). The clutches and/or torque converters 130, 132 are embedded in the multi-groove pulleys 10, 32, which are on the input shaft 12 and output shaft 28.

For an alternative embodiment, the clutch and/or torque converter 130 facilitate the transfer of power and torque between the prime mover 66 and the present invention PIC 1, 35, 100. The clutch and/or torque converter 130 enable the prime mover 66 to operate at its rotational speed while the flywheels 22 accelerate to their rotational speed. Once the input and output rotational speeds of the clutch and/or torque converter 130 are the same, then the clutch and/or torque converter 130 are locked.

For an alternative embodiment, the clutches and/or torque converters 132 facilitate the transfer of power and torque between the present invention PIC 1, 35, 100 and the gearbox 70. The clutch and/or torque converter 132 are disengaged while the flywheels 22 accelerate to their rotational speeds. After the flywheels 22 are rotating at their rotational speed, the clutches and/or torque converters 132 enable the oil well pumpjack 64 to smoothly accelerate to its operating speed. Once the input and output rotational speeds of the clutches and/or torque converters 132 are equal, then the clutches and/or torque converters 132 are locked.

Figure 27:
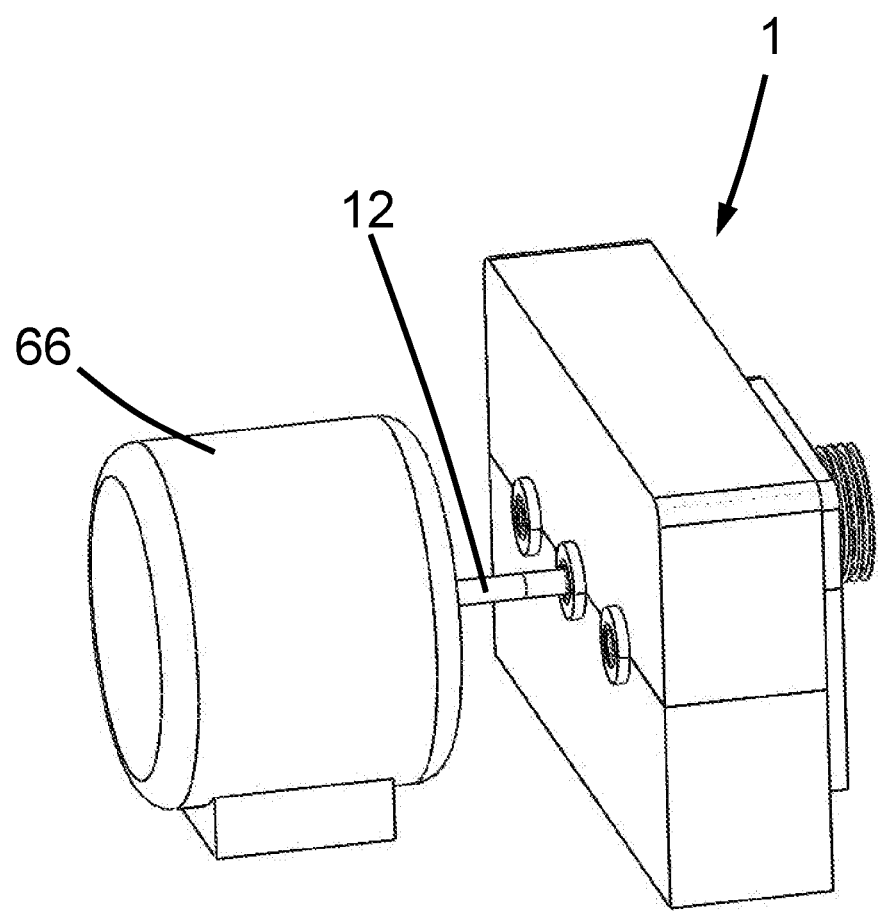
FIG. 27 is an isometric view of an alternative embodiment of the present invention where the prime mover is directly coupled to the input assembly.

For an alternative embodiment, the prime mover 66 is directly coupled to the primary shaft 12 of the primary shaft assembly 8, 42 as depicted in FIG. 27 which is an alternative method to transfer power between the prime mover and the present invention PIC 1, 35, 100. This alternative configuration combines both the prime mover and the present invention PIC 1, 35, 100 as a single unit to be attached to the oil well pumpjack 64.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A kinetic energy storage device for use with an oil well pumpjack, the device comprising:
   a primary shaft assembly configured to transfer power and torque between a prime mover of the oil well pumpjack, a flywheel assembly, and an output assembly, the primary shaft assembly having:
   a primary multi-groove pulley; a primary gear;
   a primary output gear; and
   a primary shaft extending between the primary multi-groove pulley, the primary gear, and the primary output gear;
   the flywheel assembly having one or more flywheels and one or more flywheel gears connected via a flywheel shaft; and
   the output assembly, having: an output gear;
   an output multi-groove pulley; and
   an output shaft coupling the output gear and output multi-groove pulley; wherein the output assembly transfers power and torque to a gearbox of an oil well pumpjack;
   wherein the primary output gear engages with the output gear; wherein the one or more flywheel gears engage with the primary gear;
   wherein the one or more flywheels absorb and then transfer torque to an oil well pumping unit to enable the oil well pumping unit to operate at a near constant speed; and wherein the one or more flywheels enable the prime mover to operate at a near constant speed and a near constant power.

2. The device of claim 1, further comprising:
   a frame for mounting and supporting the device between a prime mover and a gearbox of the oil well pumpjack, the frame having a plurality of bearing mounts;
   wherein the primary shaft engages with the frame via one or more bearings; and
   wherein the flywheel shaft and the output shaft engage with the frame via one or more bearings.

3. The device of claim 2, wherein the frame comprises:
   a lower frame and an upper frame;
   wherein the lower frame and upper frame secure together such that the output multi-groove pulley and the primary multi-groove pulley extend outside of the frame.

4. The device of claim 1, wherein the one or more flywheels are two flywheels, each having a flywheel gear engaged with the primary gear.

5. The device of claim 1, wherein the primary multi-groove pulley and the output multi-groove pulley are configured to engage with a V-belt to transfer torque between the device and the gearbox of the oil well pumpjack.

6. The device of claim 1, wherein the prime mover is directly coupled to the primary shaft.

7. The device of claim 1, further comprising: a clutch coupled to the primary shaft;
   wherein the clutch is configured to transfer rotational power and torque from a rotational power source to the primary shaft via the primary multi-groove pulley; and
   wherein the clutch enables the prime mover to operate at a rotational speed while the one or more flywheels accelerate at an independent rotational speed, thereby allowing the oil well pumpjack to smoothly accelerate to an operational speed.

8. A kinetic energy storage device for use with an oil well pumpjack, the device comprising:
   a primary shaft assembly configured to transfer power and torque between a prime mover of the oil well pumpjack, a flywheel assembly, and a gearbox of the oil well pumpjack, the primary shaft assembly having:
   a first multi-groove pulley; a primary gear;
   a second multi-groove pulley; and
   an input shaft extending between the first multi-groove pulley, the primary gear, and the second multi-groove pulley;
   the flywheel assembly having one or more flywheels and one or more flywheel gears connected via a flywheel shaft; and
   wherein the one or more flywheel gears engage with the primary gear;
   wherein the one or more flywheels absorb and then transfer torque to an oil well pumping unit to enable the oil well pumping unit to operate at a near constant speed; and
   wherein the one or more flywheels enable the prime mover to operate at a near constant speed and a near constant power.

9. The device of claim 8, further comprising:
   a frame for mounting and supporting the device between a prime mover and a gearbox of the oil well pumpjack, the frame having a plurality of bearing mounts;
   wherein the input shaft engages with the frame via one or more bearings; and wherein the flywheel shaft engages with the frame via one or more bearings.

10. The device of claim 9, wherein the frame comprises:
    a lower frame and an upper frame;
    wherein the lower frame and upper frame secure together such that the first and second multi-groove pulleys extend outside of the frame.

11. The device of claim 8, wherein the one or more flywheels are two flywheels, each having a flywheel gear engaged with the primary gear.

12. The device of claim 8, wherein the first multi-groove pulley and the second multi-groove pulley are configured to engage with a V-belt to transfer torque between the device and the gearbox of the oil well pumpjack.

13. The device of claim 8, wherein the prime mover is directly coupled to the input shaft.

14. The device of claim 8, further comprising: a clutch coupled to the primary shaft;
    wherein the clutch is configured to transfer rotational power and torque from a rotational power source to the primary shaft via the primary multi-groove pulley; and
    wherein the clutch enables the prime mover to operate at a rotational speed while the one or more flywheels accelerate at an independent rotational speed, thereby allowing the oil well pumpjack to smoothly accelerate to an operational speed.

* * * * *